United States Patent

Ishida et al.

[11] Patent Number: 5,642,352
[45] Date of Patent: Jun. 24, 1997

[54] LAN CONNECTING DEVICE AND LAN CONNECTING SYSTEM

[75] Inventors: Toshihiro Ishida; Toshimitsu Ohba, both of Kawasaki, Japan

[73] Assignee: Fujitsu Limited, Kanagawa, Japan

[21] Appl. No.: 502,152

[22] Filed: Jul. 13, 1995

[30] Foreign Application Priority Data

Sep. 2, 1994 [JP] Japan .................................. 6-209987

[51] Int. Cl.$^6$ .................................................. H04L 12/46
[52] U.S. Cl. .................................................. 370/401
[58] Field of Search .................. 370/17, 85.7, 85.13, 370/85.14, 95.1, 110.1, 79, 84, 401, 402, 403, 404, 405, 468

[56] References Cited

U.S. PATENT DOCUMENTS

| | | | |
|---|---|---|---|
| 4,984,264 | 1/1991 | Katsube | 370/54 |
| 5,040,171 | 8/1991 | Osaki | 370/17 |
| 5,313,467 | 5/1994 | Varghese et al. | 370/94.1 |
| 5,414,697 | 5/1995 | Osaki | 370/17 |
| 5,506,834 | 4/1996 | Sekihata et al. | 370/85.13 |

FOREIGN PATENT DOCUMENTS 1-46340   2/1989   Japan .
3-248647 11/1991   Japan .

*Primary Examiner*—Douglas W. Olms
*Assistant Examiner*—Ajit Patel
*Attorney, Agent, or Firm*—Helfgott & Karas, P.C.

[57] ABSTRACT

In the case where calls made by a calling part of a first LAN connecting device are rejected by a call receiving part of a second LAN connecting device, non setting of the number of channels needed for data transmission will be detected by a channel shortage detecting block of the first LAN connecting device. In this case, an information requesting block will make a request for information of channel availability at the time of channel releasing to the second LAN connecting device. This request will be registered in the information request registering block of the second LAN connecting device. When availability of the channels accommodated in an interface is detected by the channel monitoring block of the second LAN connecting device, an information sending block will transmit channel availability information to the first LAN connecting device in accordance with the request registered in the information request registering block.

18 Claims, 15 Drawing Sheets

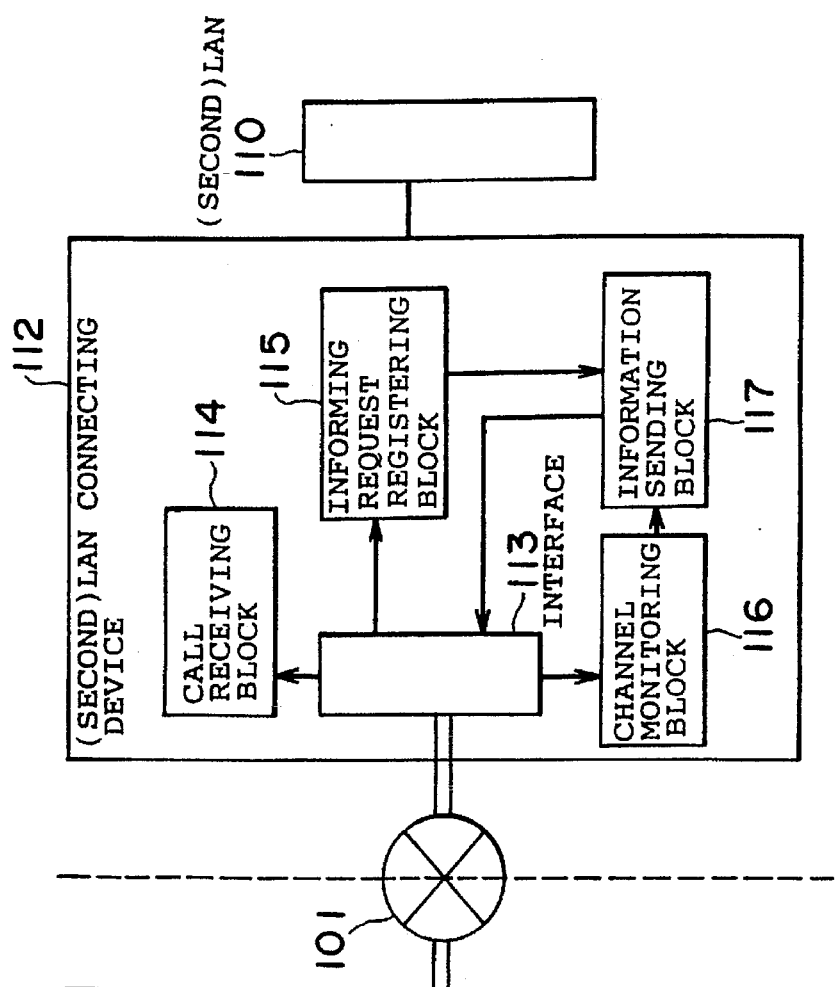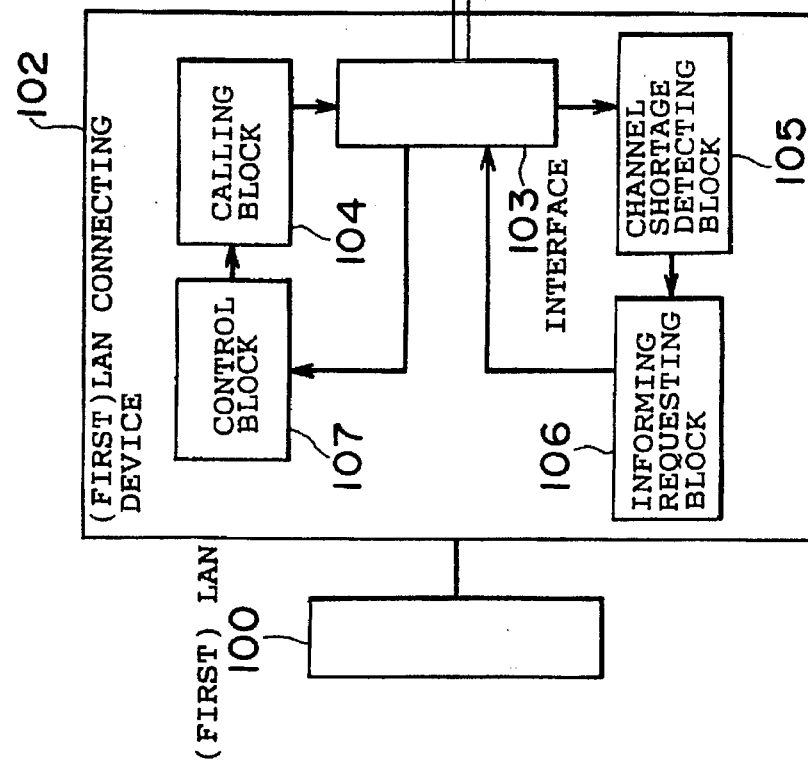

LAN CONNECTING DEVICE AND LAN CONNECTING SYSTEM

BACKGROUND OF THE INVENTION

1. Field of the Invention

The present invention relates to a LAN connecting device for connecting LAN (local area network) and WAN (wide area network) such as a public network, etc. In particular, the invention relates to a LAN connecting device provided with a function (hereinafter called "inverse MUX function") for bundling a plurality of public lines (e.g., ISDN private channel) and treating them seemingly as channels of high-speed bands.

2. Description of the Prior Art

Currently, LAN (local area network: intracompany/local information communication network) is popularly used in such limited areas as factories, research institutes, universities, and the like (hereinafter termed "offices" generically) for connecting computers in order to allow mutual transmissions of data, at high speeds. Such a LAN can not only be built independently within an area where computers are bundled together but also be connected to the public networks such as ISDN, etc., allowing communications with outside information equipments and databases via such public networks. Even in the case where a plurality of offices respectively having LAN communication operational environments built up are dispersed on different geographical areas, use of this system allows communications among all these offices as if they were connected via one LAN by connecting the LANs of the respective offices each other through the public networks.

In order to connect such LAN and the public networks, a LAN connecting device called a bridge or a router is used. The bridge is a LAN connecting device having a function for connecting LANs and filtering a packet in accordance with the Data Link address of the forwarded packet. The router is another LAN connecting device provided on the branching point of a plurality of LANs having a function for determining the path of the packet in accordance with the network address of the forwarded packet.

When linking such LAN connecting device to the other LAN connecting device via the public networks, a private line of a fixed band was used as a relay channel. In this case, the ISDN has a band of 64 kbps per one private line. However, as the amount of data to be transmitted increases, congestion will be generated if only one channel is used. For this reason, conventionally the LAN connecting device has been used in combination with a multiplexer function for distributing data to a plurality of parallelly arranged channels to transmit them to the public networks and for multiplexing data sent respectively from the plurality of such parallelly arranged channels to restore the data. Hereinafter a device for arraying data in parallel and sending them to channels is called "a multiplexer". In this way, by virtually bundling a plurality of channels, the bands of the channels are seemingly expanded and the channels can be treated as channels of high-speed bands.

Further, there is a case where the multiplexer is provided with a function for virtually increasing or decreasing the number of channels to be bundled in accordance with the amount of data to be sent, that is, the amount of traffic. In such a case, the multiplexer monitors the utilization rate of already connected channels. Then, when the amount of traffic exceeds a specified threshold level(e.g., 70%), another channel will be added to increase the band. For example, in the case where communications are carried out at the band of 64 kbps utilizing one ISDN private line, when traffic from LAN exceeds 44.8 kbps which is 70% of 64 kbps, another private line is set and the communications will be done at the band of 128 kbps.

However, at such a conventional LAN connecting device, it has been impossible to efficiently obtain channels matching the amount of traffic. Problems relating to the conventional device will be described in detail below.

<Problem 1>

As described above, at the conventional LAN connecting device, the number of channels to be virtually bundled was increased or decreased depending on the amount of traffic. By such a construction the LAN connecting device allows addition of channels to be connected when the amount of data increases during communicating. However, if a communication equipment (a LAN connecting device, etc.) at a call incoming side is engaged in communications with the other communicating equipment using a trunk line (a communication channel connecting a communication equipment and a public network), it may not be possible to connect the number of channels needed by the LAN connecting device at a call originating side. When such a situation arose, the LAN connecting device at the call originating side terminated its call or carried on communications only by already connected channels. Or more often than not it waited for the time when the line of the receiving side became empty by repeating calls at every passages of specified time.

However, in this case the LAN connecting device at the call originating side needs to make a call processing at certain time intervals while executing transmission of LAN data (routing, etc.) For this reason, loads on the CPU (Central Processing Unit) of this LAN connecting device usually increased. In order to reduce such loads on the CPU, it may be possible to equip the LAN connecting device with a multi-CPU system and to let the respective CPUs share data transmission and call processings. By such a configuration, however, the device is disadvantageous in that the costs will increase and control of the processings will become complex.

Further, if the LAN connecting device at the call originating side is constructed in such a way as to simply repeat its calls at every time intervals, even when the trunk line of the communication equipment (LAN connecting device, etc.) at the call incoming side becomes available, the LAN connecting device at the call originating side may not be able to immediately make a call because it is on a standby period set by a timer. When such a case happens, during the lag from the time when the trunk line of the communication equipment at the call incoming side becomes available to the time when the LAN connecting device at the call originating side make a call again, the other communication equipment (LAN connecting device, etc.) may connect to the available trunk line thereof. In other words, even when the LAN connecting device at the call originating side is actually linked with the communication equipment at the call incoming side via the insufficient number of channels and makes calls so as to increase the number of channels, these calls will not have precedence over calls by other communication equipment at the incoming side. Thus, though irrational, depending on timing it happened that the calls later made by the other communication equipment were received while the number of lines needed by the communication equipment at the call originating side to secure sufficient bands were not connected. This problem may not be solved even by adopting the multi-CPU system.

<Problem 2>

When the inverse MUX function is executed by the multiplexer, the band of data transferred and processed within the multiplexer, that is, within the LAN connecting device will be changed in accordance with the increase or the decrease of the number of channels to be connected. For example, when it is connected to the ISDN only by one private channel as shown in the above example, the multiplexer will only need to process data at the band of 64 kbps. However, as data are multiplexed and distributed by the multiplexer when it is connected by two private lines, the multiplexer will have to transfer and process data at the band of 128 kbps which is twice as large as 64 kbps. Thus, as the number of channels increases, the speed for transferring and processing data within the LAN connecting device will have to be increased.

The multiplexer and the other devices, for example, the interface device for the LAN within the LAN connecting device are connected by interfaces specified by CCITT recommended V.35, X.21, etc., and clocks are supplied from the multiplexer side to the other device sides. Thus, when changing bands, clock frequencies must be changed matching the changes of the bands within the multiplexer and supplied to the other devices. Then, at the other devices, data are transferred and processed based on these clock frequencies. However, at the other devices, due to abrupt changes of the clocks it took long time to acquire clock synchronism and data were lost during their changes.

SUMMARY OF THE INVENTION

Against such a background it is the main object of the present invention to provide a LAN connecting device which allows efficient acquisition of the number of channels matching the amount of traffic. The first of its selective and secondary objects of the present invention is to provide a LAN connecting device capable of solving the problems mentioned above by making it possible for the LAN connecting device which makes calls first to take precedence in channel connection without increasing loads on the CPU. Its second object is to provide a LAN connecting device capable of changing bands(and clocks) within the multiplexer unnecessary to change clock frequencies outside it and transferring and processing data.

<Construction 1>

The first configuration of the LAN connecting device at a call originating side of the present invention is a LAN connecting device for linking LAN and a network via a plurality of channels made so as to achieve the first of the secondary objects mentioned above. This LAN connecting device is provided with an interface for accommodating the plurality of channels, a calling means for making a plurality of calls requesting set of the plurality of channels, a channel shortage detecting means for detecting shortage of the number of set channels for data transmission because the communication equipment at the receiving side is in use of other channels when calls are made by the calling means, an information requesting means for requesting information on availability of the channel to the communication equipment at the receiving side when the shortage of the number of channels is detected by the channel shortage detecting means and a control means for letting the calling means make calls again to the communication means at the receiving side when availability of the channel is informed therefrom.

On the other hand, the first construction of the LAN connecting device at a call incoming side of the present invention is the one for connecting LAN and a network via a plurality of channels made so as to achieve the first of the secondary objects mentioned above. This LAN connecting device is provided with an interface for accommodating the plurality of channels, an incoming call answering means for answering a plurality of calls requesting set of the plurality of channels, an information request registering means for registering channel availability information requests from the other communication devices whose calls are rejected by the incoming call answering means since the plurality of channels are all used, a channel monitoring means for monitoring availability of the channels and an information transmitting means for sending the channel availability information to the request originating side when availability of the channels is detected by the channel monitoring means.

Further, a LAN connecting system according to the present invention comprises a network, a first LAN connecting device for connecting a first LAN and the network via a plurality of channels and a second LAN connecting device for connecting a second LAN and the network via a plurality of channels so as to achieve the first of the secondary objects mentioned above. This first LAN connecting device is provided with an interface for accommodating the plurality of channels, a calling means for making a plurality of call settings requesting set of the plurality of the channels, a channel shortage detecting means for detecting shortage of the number of set channels for data transmission since the other channels are used by the second LAN connecting means when calls are made by the calling means, an information requesting means for requesting information on availability of the channels to the second LAN connecting device when the shortage of the number of channels is detected by the channel shortage detecting means and a control means for letting the calling means make calls again to the second LAN connecting device when the channel availability information is sent therefrom. The second LAN connecting device is provided with an interface for accommodating the plurality of channels, an incoming call answering means for answering a plurality of calls requesting set of the plurality of channels, an information request registering means for registering the channel availability information request when the request is made from the first LAN connecting device, a channel monitoring means for monitoring availability of the channels and an information transmitting means for sending the channel availability information to the first LAN connecting device when availability of the channels is detected by the channel monitoring means.

According to the present invention, messages for requesting information on channel availability may include identification information of the LAN connecting device at the call originating side. Further, the control means of the LAN connecting device at the call originating side (the first LAN connecting device) may request the calling means to add the identification information thereof to a message for the calls. In this way, in the case where the first LAN connecting device makes calls again, the LAN connecting device at the call incoming side (the second LAN connecting device) will answer calls only when the identification information (identification number included in the channel availability information request) registered in its information registering means and the identification information added to the message for the calls are coincident.

In a LAN connecting method using the first LAN connecting device according to the present invention, the device makes calls to the communication equipment at the call incoming side. When the number of the set channels is short for data transmission since the channels are in use by the communication equipment at the receiving side, the device will request a channel availability information from the communication equipment at the receiving side. When the channel availability information is sent from the communication equipment at the receiving side upon receiving this request, calls will be made again to the communication equipment.

Further, in a channel connecting method of the LAN connecting system using such LAN connecting devices, calls are made from the first LAN connecting device to the second LAN connecting device. Then, when these calls can not set the number of channels needed for data transmission due to in-use of the other channels by the second LAN connecting device, the first LAN connecting device will request a channel availability information at the time of line releasing from the second LAN connecting device. When receiving the request for the channel availability information from the first LAN connecting device, the second LAN connecting device will register this request. When the lines become available, the second LAN connecting device will send the channel availability information to the first LAN connecting device. Upon receiving the channel availability information from the second LAN connecting device, the first LAN connecting device will make calls again to the second LAN connecting device.

In the case where the second LAN connecting device receives the request for the channel availability information from the first LAN connecting device, a step may be added for rejecting calls from a terminal connected to the LAN under the second LAN connecting device. In this way, by rejecting not only calls from the other LAN connecting devices but also those from its own terminals it will be able to put priority on calls incoming from the first LAN connecting device.

<Construction 2>

The second LAN connecting device according to the present invention is the one for connecting a LAN and a network via a plurality of channels made so as to achieve the second of the secondary object described earlier. This LAN connecting device is provided with an interface for housing the plurality of channels, a calling means for making a plurality of call setting requests using the plurality of channels, a channel number calculating means for calculating the number of channels matching the amount of data to be transmitted to the network and requesting the calling means to set calls on these channels, a second interface for housing the LAN, a buffer for temporarily storing data transmitted from the LAN via the second interface, a data writing means for writing the data in this buffer at a fixed band and a data transmitting means for sending the data written in the buffer to the first interface at a band according to the number of channels where the calls are set.

It is possible to combine this second construction with the first of the LAN connecting device. In this case, the LAN connecting device must be constructed comprising a first interface for housing the plurality of channels, a calling means for making a plurality of call setting requests using the plurality of channels, a channel number calculating means for calculating the number of channels matching the amount of data to be transmitted to the network and requesting the calling means to set calls on these channels, a channel shortage detecting means for detecting non setting of calls on the number of channels requested by the channel number calculating means due to engagement of the channels by the communication equipment at the receiving side when the call settings are requested by the calling means, an information requesting means for requesting channel availability information at the time of channel releasing to the communicating equipment at the receiving side when not setting of calls on the number of channels calculated by the channel number calculating means is detected by the channel shortage detecting means, a control means for letting the calling means make call setting requests again to the communication equipment at the receiving side when the channel availability information is sent therefrom, a second interface for housing the LAN, a buffer for temporarily storing data transmitted from the LAN via this second interface, a data writing means for writing the data in this buffer at a fixed band and a data transmitting means for sending the data written in the buffer to the first interface at a band according to the number of channels where the calls are set.

The first interface is provided with a function for parallelly sending data as it houses a plurality of channels. Also, the data transmitting means is provided with a function for sending data to the first interface at a band according to the number of channels where calls are set. Thus, these first interface and data transmitting means play the role of a multiplexer for arraying data in parallel and transmitting them to channels.

The data writing means is for writing data received via the second interface in the first buffer. It is possible to provide a second buffer for temporarily storing this data before writing. In this case, the data transmitting means sends the data from the second buffer to the first buffer. In this way, even in the case where it takes time to read data as it is read from the first buffer at a slow band, data to be written may be stored in the second band. Further, the data writing means may be constructed so as to request the data transmitting means to send the data written in the buffer to the first interface when writing of the data in the buffer is completed. Thus, it is possible to send the data without any delays following writing of the data.

The buffer may be constructed comprising a plurality of buffers connected to one another in parallel. In this case, the data writing means writes data in the plurality of these buffers in sequence. Also, the data transmitting means takes out data sequentially from these buffers and sends them to the first interface. In this way, while the data writing means is writing data in some buffers, the data transmitting means may read data from the other buffers at the same time. Consequently, the speed for passing these buffers by data will be increased and thereby it will be made possible to prevent flowing and thus loses of data before wiring in the buffers.

It may be possible to divide the LAN connecting device according to the present invention into a multiplexer (including the first interface and the data transmitting means) and a terminal equipment (including the data writing means) connected to the LAN and treat them as separate devices. In this case, communications between the devices can be operated using a data frame.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1(a) and 1(b) are block diagram showing the principle of the first embodiment according to the present invention.

DESCRIPTION OF THE PREFERRED EMBODIMENTS

Figure 2:
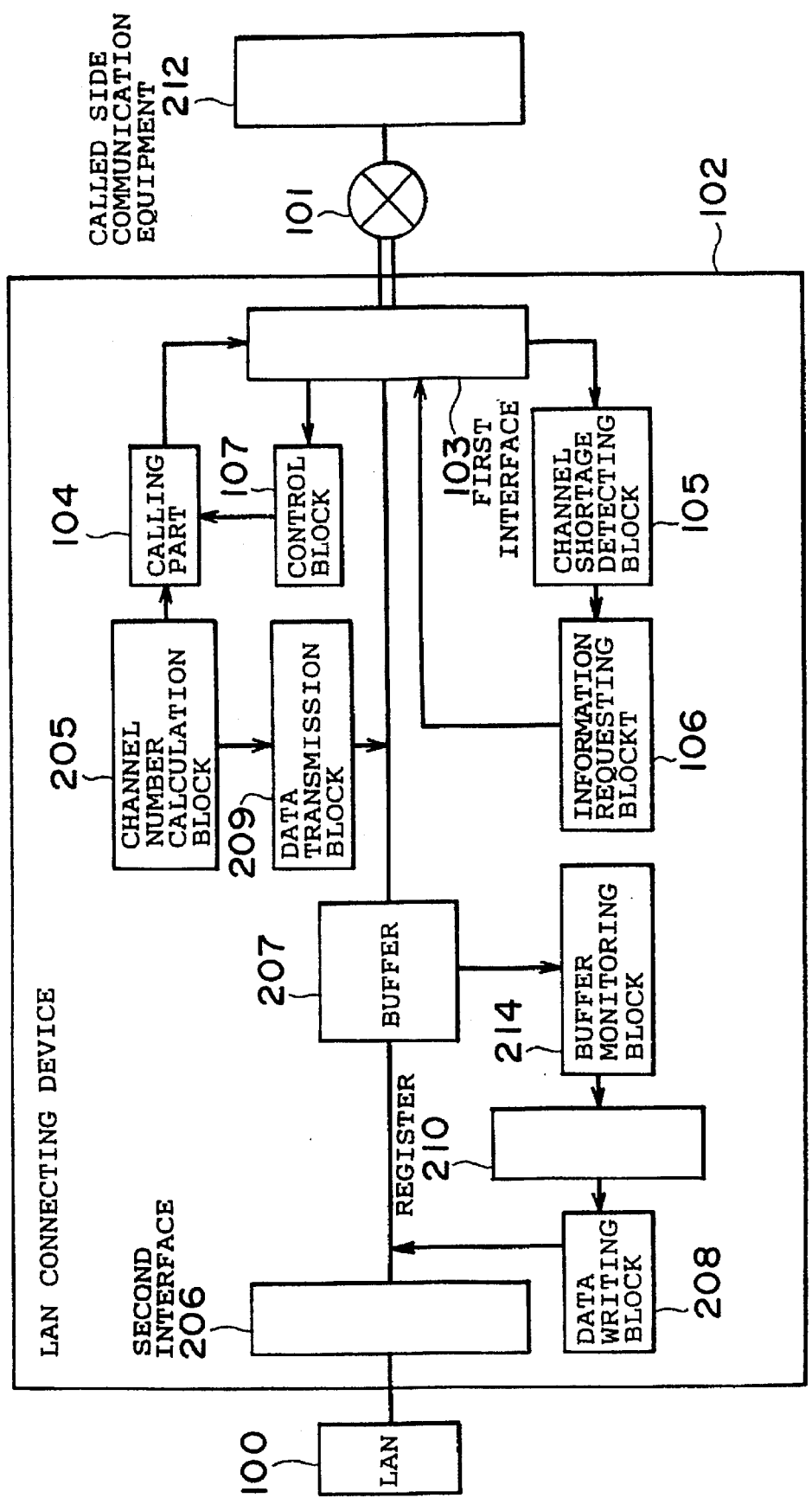
FIG. 2 is a block diagram showing the principle of the first embodiment according to the present invention.

The preferred embodiments according to the present invention will be described in detail with reference to the accompanying drawings.

FIRST EMBODIMENT

<Principle of the Embodiment>

Its principle will be described prior to explanation of the first embodiment.

As shown in FIGS. 1(a) and 1(b), in the case where calls made by a calling part 104 at a first LAN connecting device 102 are rejected by a call receiving part 114 at a second LAN connecting device 112, non setting of the calls on the number of channels needed for data transmission will be detected by a channel shortage detecting part 105 at the first LAN connecting device 102. When nonsetting of calls on the necessary number of channels is detected by this channel shortage detecting part 105, an information requesting part 106 will make a request for information on channel availability at the time of channel releasing to the second LAN connecting device 112. This request will be registered in the information request registering part 115 of the second LAN connecting device 112. When availability of the channels housed in an interface 113 is detected by the channel monitoring part 116 of the second LAN connecting device 112, an information sending part 117 will transmit channel availability information to the first LAN connecting device 102 in accordance with the request registered in the information request registering part 115. Upon receiving this channel availability information, a control part 107 at the first LAN connecting device 102 will request the calling part 104 to make calls again to the second LAN connecting device 112. In this way, as it is not necessary for the first LAN connecting device 102 to repeat periodical call processings during data transmission, loads on the CPU will be reduced. In addition, by immediately making calls again it will be given priority in channel connection.

Further, as shown in FIG. 2, when data sent from a LAN 100 is received by a second interface 206 at the LAN connecting device 102, a data writing part 208 will write this data in a buffer 207. A data transmitting part 209 will sent the data written in the buffer 207 to a network 201 via the first interface 103. A channel number calculating part 205 will calculate the number of channels according to the amount of data to be transmitted. The calling part 104 will make additional calls based on this calculated number of channels. This is how the number of channels where these calls are set for transmitting data to a network 101 is increased. The data transmitting part 209 will change bands at which data is sent to the first interface 103 in accordance with this number of channels where the calls are set. Thus, it will not be necessary for a circuit placed toward the LAN 100 from the buffer 207 to change its clock frequencies for data transmission and processing even if the number of channels is increased.

Figure 3:
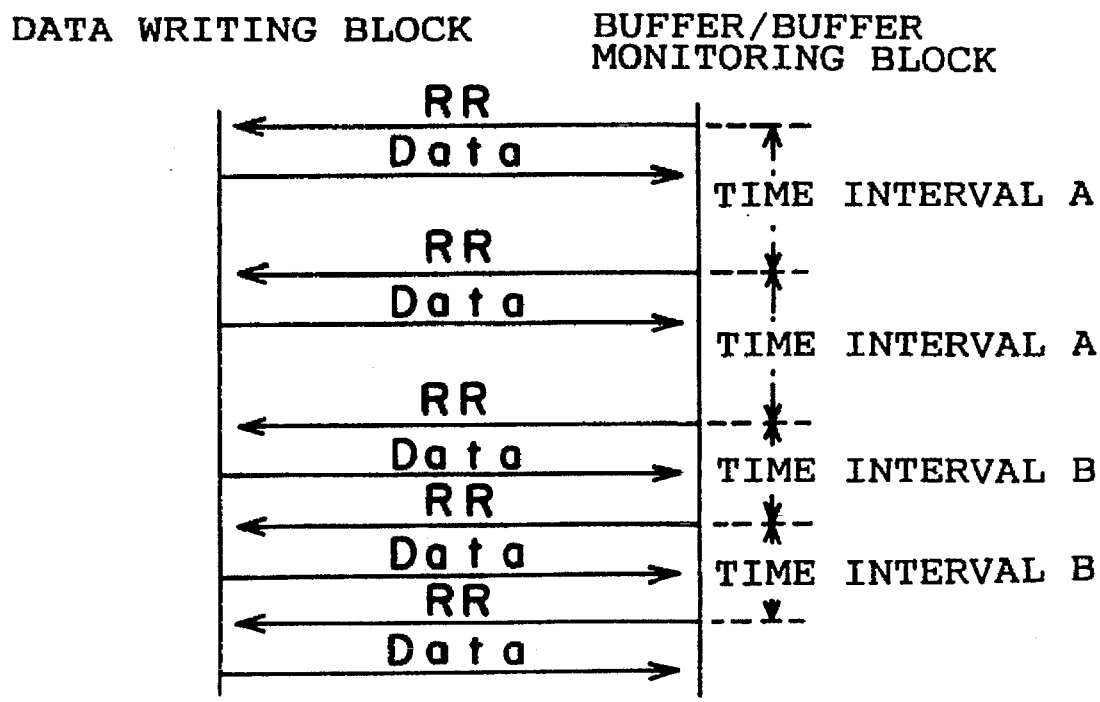
FIG. 3 is a time arrow view showing the movements of a buffer monitoring part in FIG. 2.

As shown by the time arrow view in FIG. 3, a buffer monitoring part 214 will send a writable signal (RR) indicating that writing is allowed when transmission of all the data written in the buffer 207 to the first interface 103 is completed. In this case, upon receiving this writable signal (RR) the data writing part 208 will write the data in the buffer 207. In this way, writing in the buffer 207 and transmission of data therefrom will not be executed simultaneously. Thus, it will be possible to prevent loses of previously written data caused by writing new data thereon.

Further, when transmission of the data written in the buffer 207 to the first interface 103 is not completed yet, the buffer monitoring part 214 will send unwritable signal (RNR) indicating that writing is prohibited to the data writing part 208. In this case, upon receiving this unwritable signal(RNR) the data writing part 208 will stop writing the data in the buffer 207 until it receives the writable signal (RR). In this way, writing in the buffer and transmission of data therefrom will be alternately repeated. Thus, it will be possible to prevent losses of previously written data caused by writing new data thereon. In addition, writing by the data writing part 208 and reading by the data transmitting part 209 will be operated at different pulse cycles.

Figure 4:
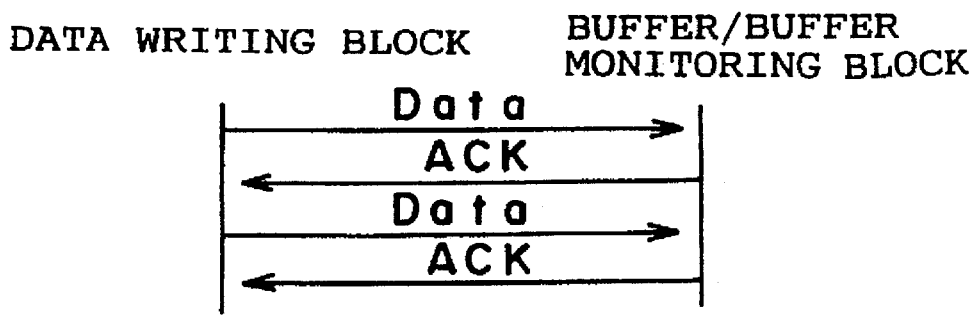
FIG. 4 is a time arrow view showing the movements of a buffer monitoring part in FIG. 2.

Further, as shown in FIG. 4, when data writing by the data writing part 208 in the buffer 207 is completed, the buffer monitoring part 214 will send a receiving confirmation signal(ACK) indicating that the data has been received to the data writing part 208. In this way, the data writing part 208 will be allowed to detect the existence of data transmission errors.

Furthermore, the buffer monitoring part 214 monitors each of the buffers composing the buffer 207. As the operations mentioned above are carried out while being monitored by the buffer monitoring part 214, the data writing by the data writing part 208 and the data transmission by the data transmitting part 209 will be made more efficient.

In a register 210 provided between the buffer monitoring part 214 and the data writing part 208 contents of communications there between are written. Thus, as the contents of communications between them 214 and 208 are held in the register 210 for a certain period of time, synchronization therebetween for communications will be made unnecessary.

<Construction of the Embodiment>

Figure 5:
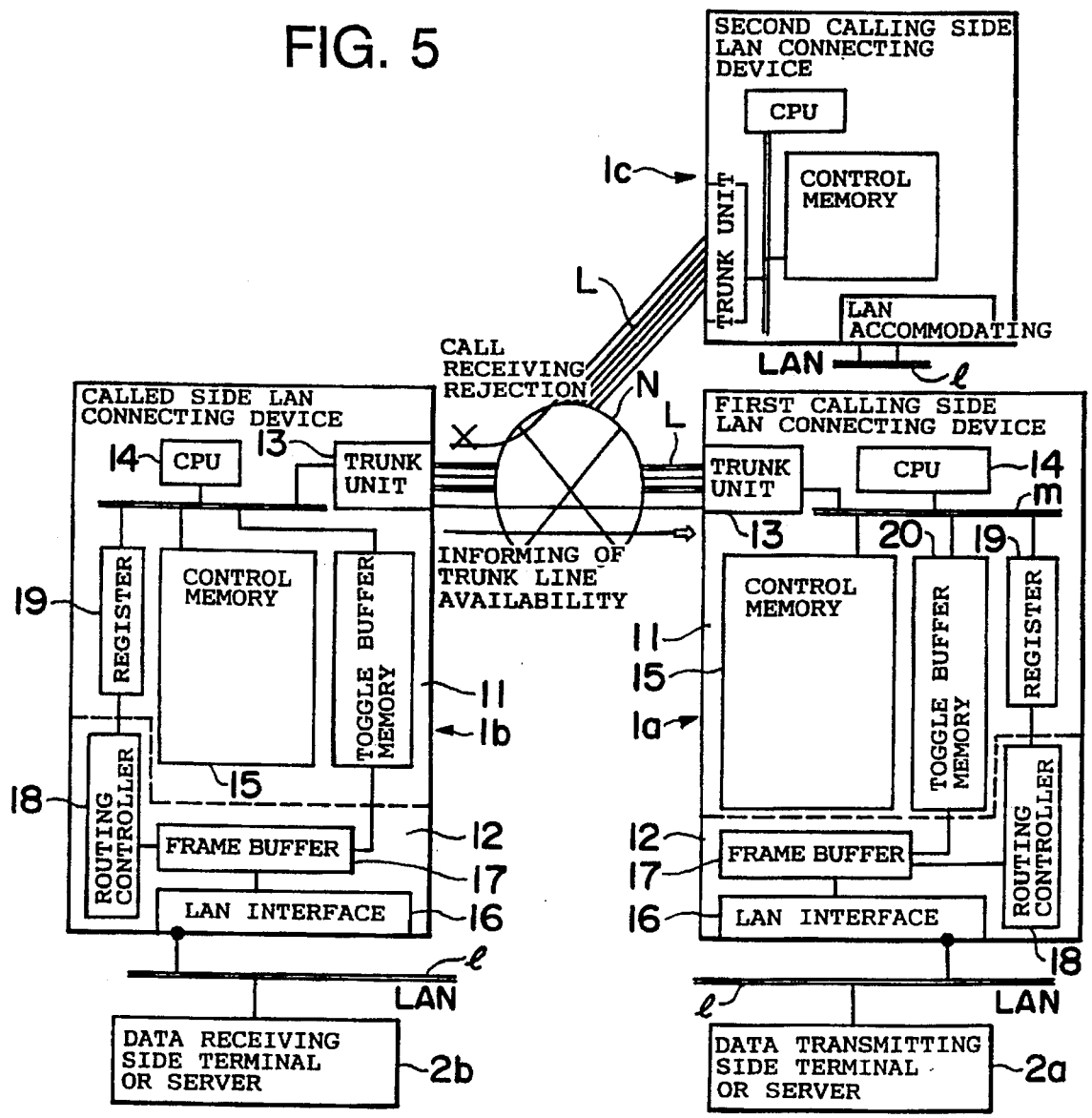
FIG. 5 is a block diagram showing a distributed LAN system at the first embodiment according to the present invention.

FIG. 5 is a schematic view showing the construction of a LAN connecting device 1 and LANs connected to a public network N by this LAN connecting device 1 at the first embodiment according to the present invention.

In FIG. 5, three LANs constructed on three different areas are connected to one another by ISDN as a public network. This ISDN is one kind of WAN (wide area network).

Figure 6:
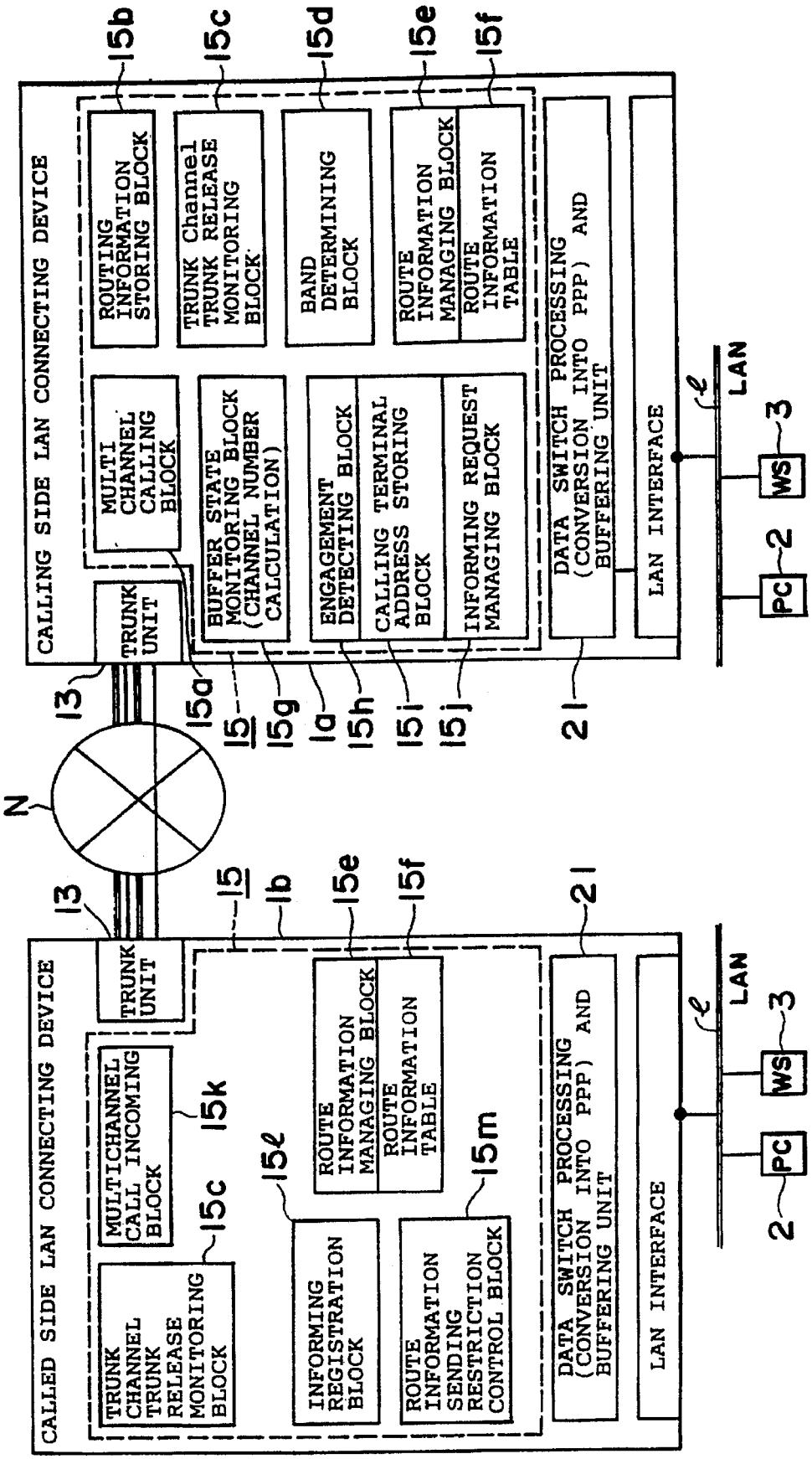
FIG. 6 is a block diagram showing the details of a LAN connecting device in FIG. 5.

As shown in FIG. 6, each LAN is constructed by mutually connecting pluralities of personal computers(PC) 2 and work stations(WS) 3 via a connecting channel 1 of Ethernet, etc. To this connecting channel 1 of each LAN the LAN connecting device 1 is connected. By this LAN connecting device each LAN will be connected to ISDN. Thus, the personal computers 2 and the workstations 3 housed in the respective LANs will make accessing to the public network N via the LAN connecting device 1, which will allow their communications with the other terminals connected thereto and the personal computers 2 and the workstations 3 housed in the other LANs under the LAN connecting device 1. These "other terminals" and "LAN connecting device 1" are generically called communication equipments.

The LAN connecting device 1 and the public network N are connected by a plurality of trunk channels L. These trunk channels are specially used for ISDN. The number of these channels is determined fixedly for each LAN. However, they are virtual channels.

The internal construction of this LAN connecting device 1 is largely divided into a multiplexer 11 and other devices 12 in terms of functions. These devices 12 play roles of bridges. Inside the devices 12, LAN data is transferred and processed in accordance with protocol within the LAN. Also, transferring of LAN data is carried out in accordance with fixed clock frequencies therein.

On the other hand, at the multiplexer 11 LAN data having passed through the devices 12 are multiplexed and these multiplexed data are encapsulated in accordance with point to point protocol with the other communication equipments (LAN connecting device 1). Also, at the multiplexer 11 ISDN is finished and LAN data sent in encapsulated states from the other communication equipments(LAN connecting device 1) are separated and restored. This multiplexer 11 is provided with a function equivalent to a router. Data transfer therein is carried out in accordance with clock frequencies (e.g., 64 kbps, 128 lbps, 256 lbps, . . . ) to be changed depending on the increase/decrease of the number of trunk channels.

The respective components of the LAN connecting device will be described hereinbelow. For the purpose of explanation, the constructions of LAN connecting devices 1a and 1c at a caller side and a LAN connecting device 1b at a receiving side are slightly different between FIGS. 5 and 6. However, as a real LAN connecting device 1 is provided with both functions of the caller and receiving sides, all of the components described in both LAN connecting devices 1a and 1b are provided.

In FIG. 5, a trunk channel trunk 13 connected to the trunk channel L is connected to a CPU(Central Processing Unit) 14, a control memory part 15, a register 19 and a toggle buffer memory 20 via a bus (m). The toggle buffer memory 20 is directly connected to a frame buffer 17 while the register 19 is connected to the frame buffer memory 17 via a routing controller 18. This frame buffer 17, in turn, is connected to a LAN interface 16. This LAN interface 16 is connected to the connecting channel 1 of the LAN.

The trunk channel trunk 13 as the first interface 103 is an interface for housing the trunk channel L. Though not shown in the Figure, the trunk channel trunk 13 is constructed by a plurality of channel interface units prepared corresponding to each trunk channel L. Each of the plurality of these channel interface units is provided with a buffer(not shown in the Figure) for taking out corresponding ones from data sent in time division multiplexed states from the CPU 14 at certain bands (e.g., 64 kbps, 128 kbps, 256 kbps, . . . ) and sending them to the trunk channel L at a band(64 kbps) special for ISDN.

The CPU 14 as a control means 107 and a data transmitting means 209 is a processing device for executing programs loaded to the control memory part 15 and operating various controllings within the multiplexer 11.

The LAN interface 16 as a second interface 206 is an interface for housing LANs.

The frame buffer 17 is a buffer for temporarily storing LAN data frames sent from the LAN side via the LAN interface 16.

Figure 7:
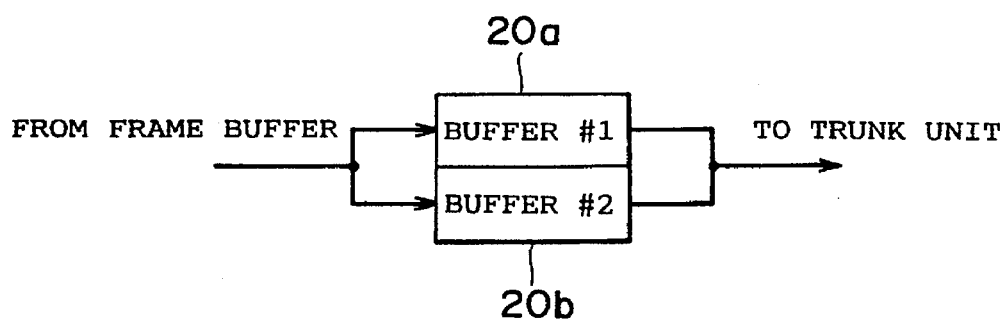
FIG. 7 is a view showing in detail the construction of a toggle buffer memory in FIG. 5.

The toggle buffer memory 20 as a buffer 207 is a buffer for relaying the frame buffer 17 and the trunk channel trunk 13. As shown in FIG. 7, this toggle buffer memory 20 is constructed by two parallelly connected buffers 20a and 20b. Reading of data from this toggle buffer memory 20 can be operated at pulse frequencies(bands) different from those at the time of writing. Thus, by passing data through this toggle buffer memory 20, it is possible to transform the bands of LAN data sent from the LAN side at fixed bands into optional bands.

Further, in order to continuously read LAN data at optional bands, the LAN data must be read at once after they are temporarily stored in the toggle buffer memory 20. However, if writing and reading are alternately carried out, delays will be generated as a result. Thus, the toggle buffer memory 20 is constructed by a plurality of buffers 20a and 20b allowing alternate operations of writing and reading. Consequently, the same result can be obtained at the toggle buffer memory 20 as a whole as when reading is continuously done.

Further, termination of the point to point protocol by ISND is operated on this toggle buffer memory 20. At this embodiment, the toggle buffer memory 20 is constructed by two buffers 20a and 20b. However, it is possible to increase the number of buffers to three or more.

The LAN data frames stored in the frame buffer 17 are transferred to the toggle buffer 20 in accordance with instructions from the routing controller 18 as a data writing means. This routing controller 18 is operated independent of the CPU 14 and used for controlling relaying of received frames to the ISDN side.

That is, the routing controller 18 communicates with the CPU 14 via the register 19 and receives information on receiving of the toggle buffer therefrom. Then, if the CPU informs that either of the buffers 20a and 20b is available for receiving (hereinafter this state is called "RR"), the routing controller 18 will transfer the LAN data stored in the frame buffer 17 the buffer 20a or 20b. On the other hand, if the CPU 14 informs that any of the buffers 20a and 20b are not available for receiving (hereinafter this state is called "RNR"), the routing controller 18 will stop transmission of the LAN data from the frame buffer 17 to the buffers 20a and 20b. In addition, the routing controller 18 makes interruption on the CPU 14 and instructs transferring of the LAN data written in the toggle buffer memory 20 to the public network N.

Figure 8:
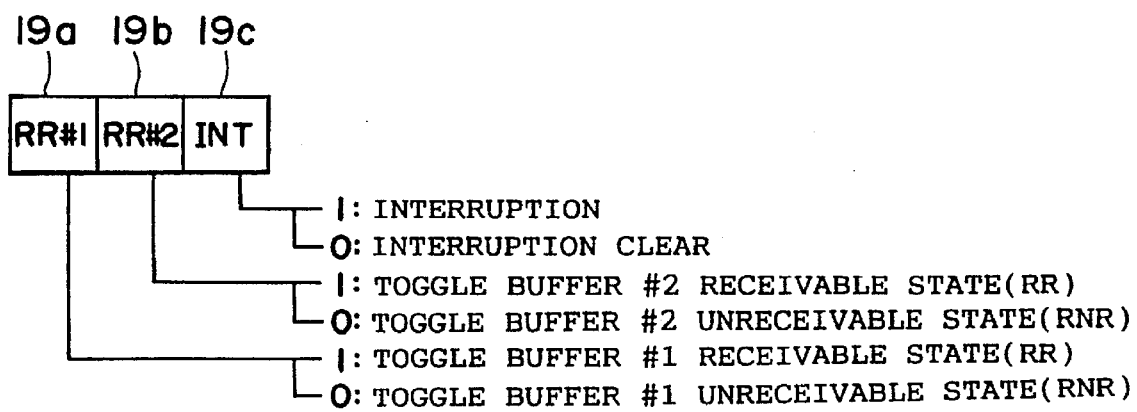
FIG. 8 is a view showing in detail the construction of a register in FIG. 5.

The register 19 is the one for sending and receiving control information between the CPU 14 and the routing controller 18. As shown in FIG. 8, the register 19 is divided into three areas. The first area 19a shows the receiving state of the first buffer 20a while the second area 19b shows the receiving state of the second buffer 20b. The third area 19c shows the existence of interruption from the routing controller 18 on the CPU 14. "1" will be written in the first and second areas 19a and 19b by the CPU 14 when the corresponding buffers 20a and 20b are in receivable states (RR) while "0" will be written when they are in unreceivable states(RNR). The routing controller 18 reads the state of this bit and executes or terminates transferring of the LAN data to the toggle buffer memory 20. On the other hand, when the routing controller 18 finishes transferring of the LAN data, bit "1" showing the existence of interruption will be erected on the third area 19c by the routing controller 18. When this bit "1" showing the existence of interruption is read, the CPU 14 will transfer data in the toggle buffer memory 20 to the trunk channel trunk 13. Further, when the CPU finishes processing the interruption, the bit "1" showing the existence of interruption will be cleared by the CPU 14.

The control memory part 15 includes an area for storing programs to make each functional part function and a data storage part for storing data (including tables) as shown in FIG. 6. The functional parts which are made to function by executing the programs within the control memory part 15 include a multichannel calling part 15a, a trunk channel trunk release monitoring part 15c, a band determining part 15d, a route information managing part 15e, a buffer state monitoring (channel number calculation) part 15g, an engagement detecting part 15h, an information request making managing part 15j, a multichannel call incoming part 15k and a route information sending limit control part 15m. On the other hand, the data storage part includes a routing information storing part 15b, a route information table 15f, a calling terminal address storing part 15i and an information registration storing part 15l.

The multichannel calling part 15a as a calling part 104 makes calls for every trunk channels connected to the trunk channel trunk 13 and makes request for channel setting to the public network N. In addition, the multichannel calling part 15a can make a plurality of calls simultaneously to different receiving sides for every channels.

The routing information part 15b is the one for storing a share of the channel allotted for each LAN data.

The trunk channel trunk release monitoring part 15c as a channel monitoring means 16 is the one for monitoring releasing of the trunk channel L at the trunk channel trunk 13. That is, when communications (transferring of the LAN data) carried out via the channel set on any of the trunk channels L are finished, this channel will be released. The trunk channel trunk release monitoring part 15c monitors which channel on the trunk channels L has been released.

The route information managing part 15e is the one having a function as a router. This route information managing part 15e reads communicating opposite side information included in the LAN data, retrieves the route information table 15f from this communicating opposite side information and manages the routes within the ISDN for transmitting this data.

The route information table 15f is the one showing relations between the communicating opposite side information included in the LAN data and the routes within the ISDN.

The buffer state monitoring part(channel count calculating part) 15g as a buffer monitoring means 214 and a channel count calculating means 205 is the one for monitoring the states of the respective buffers 20a and 20b composing the toggle buffer memory 20. When there is still room on the buffers 20a and 20b, bit "1" will be erected on the corresponding register areas 19a and 19b. Likewise, when the buffers 20a and 20b are filled, bit on the corresponding register areas 19a and 19b will be cleared. Further, the buffer monitoring part 15g monitors the data transmission throughput of the toggle buffer memory 20. Then, the number of channels according to this data transmission throughput is calculated. That is, when the throughput decchannels, calculation will be made so as to increase the number of channels. In this way, by increasing or decreasing the number of channels it will be possible to set the data transmission throughput within a certain range. In addition, the number of channels thus calculated will be reported to the multichannel calling part 15a. The multichannel calling part 15a will in turn make additional calls and allot the number of channels needed for the addition to the LAN data. Which LAN data the added channels are allotted to will be stored in the routing information storing part 15b. Also, the calculated number of channels will be reported to the engagement detecting part 15h.

The engagement detecting part 15h as a channel shortage detecting means 105 detects engagement based on the result of callings by the multichannel calling part 15a in the case where there is a shortage of available channels of the communication equipments at the receiving side.

The address (identification information) of its own LAN connecting device is stored in the calling terminal address storing part 15i.

The information request making managing part 15j as an information requesting means 106 makes "information requests at the time of channel releasing at the call incoming side" to be sent to the LAN connecting device 1b thereat when calls are made by the multichannel calling part 15a. These "information requests" are information to be sent when the LAN connecting device 1b at the call incoming side is engaged with the other communication equipments and information for requesting reporting of channel disengagement to the LAN connecting device 1a at the caller side. In these "information request" the addresses (identification information) stored in the calling terminal address storing part 15i will be written. Further, these "information requests" will be informed by, for example, routing information protocol(RIP). It is possible to use other routing protocols as informing means.

The multichannel call incoming part 15k as a call receiving means 114 receives calls made from the other communication equipments via the trunk channel trunk 13, identifies the possibility of channel connection for the calls and connects the channels or rejects connection.

In the information registration storing part 15m as an information sending means 117 the "information requests at the time of channel releasing at the receiving side" will be registered when they are received from the LAN connecting device 1a at the calling side.

The route information sending limit control part 15m as an information sending means 117 sends information as to availability of the trunk channels to the LAN connecting device 1a at the caller side and limits its sending to the other communication equipments. That is, in the case where releasing of the trunk channel trunk is identified by the trunk channel trunk release monitoring part 15c, based on the address of the LAN connecting device 1a at the caller side included in the "information requests at the time of channel releasing at the receiving side" registered in the information registration storing part 151, the route information sending limit control part 15m will obtain the route information of the LAN connecting device 1a at the caller side from the route information managing part 15e and inform releasing of the trunk channels thereto. On the other hand, even when releasing of the trunk channel trunk is identified by the trunk channel trunk release monitoring part 15c, the route information sending limit part 15m will not inform it to the communication equipments not registered in the information registration storing part 151.

Further, in FIG. 6, a data switching processing and buffer filing part 21 is shown comprising a frame buffer memory 17, a routing controller 18, a register 19 and toggle buffer memory 20.

Next, contents of controls executed at the LAN connecting device thus constructed will be described. For the purpose of explanation, the LAN connecting devices 1a are mutually connected via ISDN as shown in FIG. 5.

First, controls up to connecting channels necessary for transmitting LAN data will be described with reference to FIG. 9.

Figure 9:
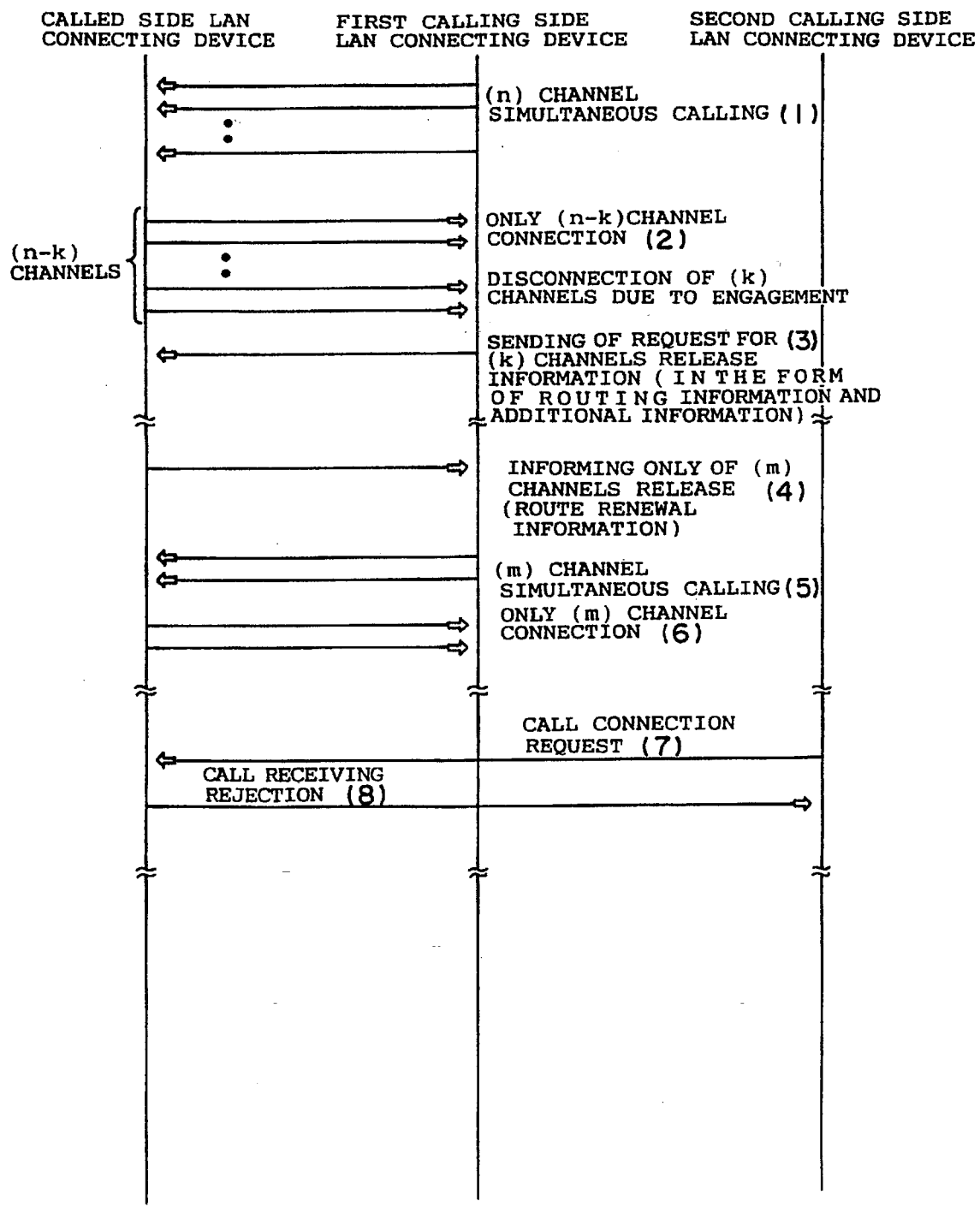
FIG. 9 is a time arrow view showing channel connecting at the first embodiment according to the present invention.

In FIG. 9, at first the multichannel calling part 15a of the first LAN connecting device 1a at the caller side obtains information on the number of channels ((n) channels) calculated by the buffer state monitoring part 15g, makes a request for connecting (n) channels to the LAN connecting device 1b at the receiving side and makes calls simultaneously (1.).

The LAN connecting device at the receiving side cannot connect the (k) channels of the (n) channels requested for connection by the first LAN connecting device 1a at the caller side since some of the channels are busy due to communications with the other communication equipments. Thus, in this case, the multichannel call incoming part 15k of the LAN connecting device 1b at the receiving side will connect only (n-k) channels with the first LAN connecting device 1a at the caller side (2.).

At the first LAN connecting device 1a at the caller side, the information request making managing part 15j makes requests for information on releasing of the (k) channels when detecting that the connected number of channels has not reached the channel count calculated by the buffer state monitoring part 15g (3.). That is, a request will be made to the LAN connecting device 1b at the receiving side for its information to be given when the channels are disengaged thereat. In this case, a request will be made for information to be continuously given until the accumulated number of released channels reaches the (k) channels. Further, this request must be made in the form of routing information+ additional information in accordance with the routing information protocol.

At the LAN connecting device at the receiving side, this request will be registered in the information registration storing part 151.

On the other hand, data communications by the (n-k) channels will be started between the first LAN connecting device 1a and the LAN connecting device 1b at the receiving side. Then, when the trunk channel trunk release monitoring part 15c within the LAN connecting device 1b detects availability of the (m)(k>m) channels of the (k) channels, the LAN connecting device 1b at the receiving side will inform the first LAN connecting device 1a of it in accordance with the release information at the time of channel disengagement at its side registered in the information registration storing part 151 (4.). That is, a routing information renewing signal with channel release information written therein will be sent only to the first LAN connecting device 1a using the (n-k) channels.

Generally, the LAN connecting device 1b at the receiving side gives information on the availability states of the trunk channels to all the LAN connecting devices 1a and 1b included in the network if some channels are disengaged. However, in the case where "informing requests at the time of channel release at the receiving side" are registered, the LAN connecting device 1b at the receiving side will send the routing renewing signal with the channel release information written therein only to the LAN connecting device 1a which has sent the informing request when some channels are disengaged. That is, to the other LAN connecting devices 1c it will not send the routing information renewing signal with the channel release information written therein or send the channel release information by a periodical routing information renewing signal or the like after a certain passage of time. Herein, "after a certain passage of time" means that the routing information renewing signal which is usually sent once about 30 seconds is omitted once or twice (not transmitted). Such a time lag is allowed, generally because no troubles will be generated even if the periodical routing information renewing signal is not sent for about 180 seconds.

At the first LAN connecting device 1a at the caller side, when the routing information renewing signal having channel release information is received, the multichannel calling part 15a will make calls equivalent to the channel count ((m) channels) shown in the channel release information simultaneously in order to increase the number of connection channels close to the needed number (5.). Further, data showing the number of released channels may or may not be included in the channel release information. When there is no data showing the number of released channels, the multichannel calling part 15a will make simultaneous calls equivalent to the needed (k) channels.

Upon receiving these calls, the multichannel call incoming part 15k of the LAN connecting device 1b at the receiving side will check the call number of the ISDN of the LAN connecting device 1a at the call originating side. In this case, as the address written in the "informing requests at the time of channel releasing at the receiving side" registered in the information registration storing part 151 and the call number of the ISDN correspond to each other, only the (m) channels of the channels for which the calls are made will be targeted and the calls will be connected thereto (6.). Thereafter, the controls from 4. to 6. will be repeated until the number of connected channels reaches the needed number.

Further, in the case where after the "informing requests at the time of channel releasing at the receiving side" are registered calls are made from the LAN connecting device(a second calling side) other than the LAN connecting device 1a which has requested for registration (7.), as the address written in the "informing requests at the time of channel releasing at the receiving side" registered in the information registration storing part 151 and the call number of the ISDN do not correspond to each other, its calls will be rejected (8.). Moreover, after registration of the "informing requests at the time of channel releasing at the receiving side", even when data communications are requested from the terminals/ servers (personal computers 2 or workstations 3) under the control of the LAN connecting device 1b at the receiving side, allotting of the newly released channels to these data communications will be prohibited.

Further, in the case where calls are connected to the needed number of channels for the LAN connecting device 1a which has requested for registration, as the registration of the "informing requests at the time of channel releasing at the receiving side" is erased at the information registration storing part 151, its calls will be set in a usual manner.

By the controls thus made, it will be made possible to give priority on connection of the channels between the LAN connecting device 1a at the calling side whose "release informing requests" have been registered and the LAN connecting device 1b at the receiving side.

Figure 10:
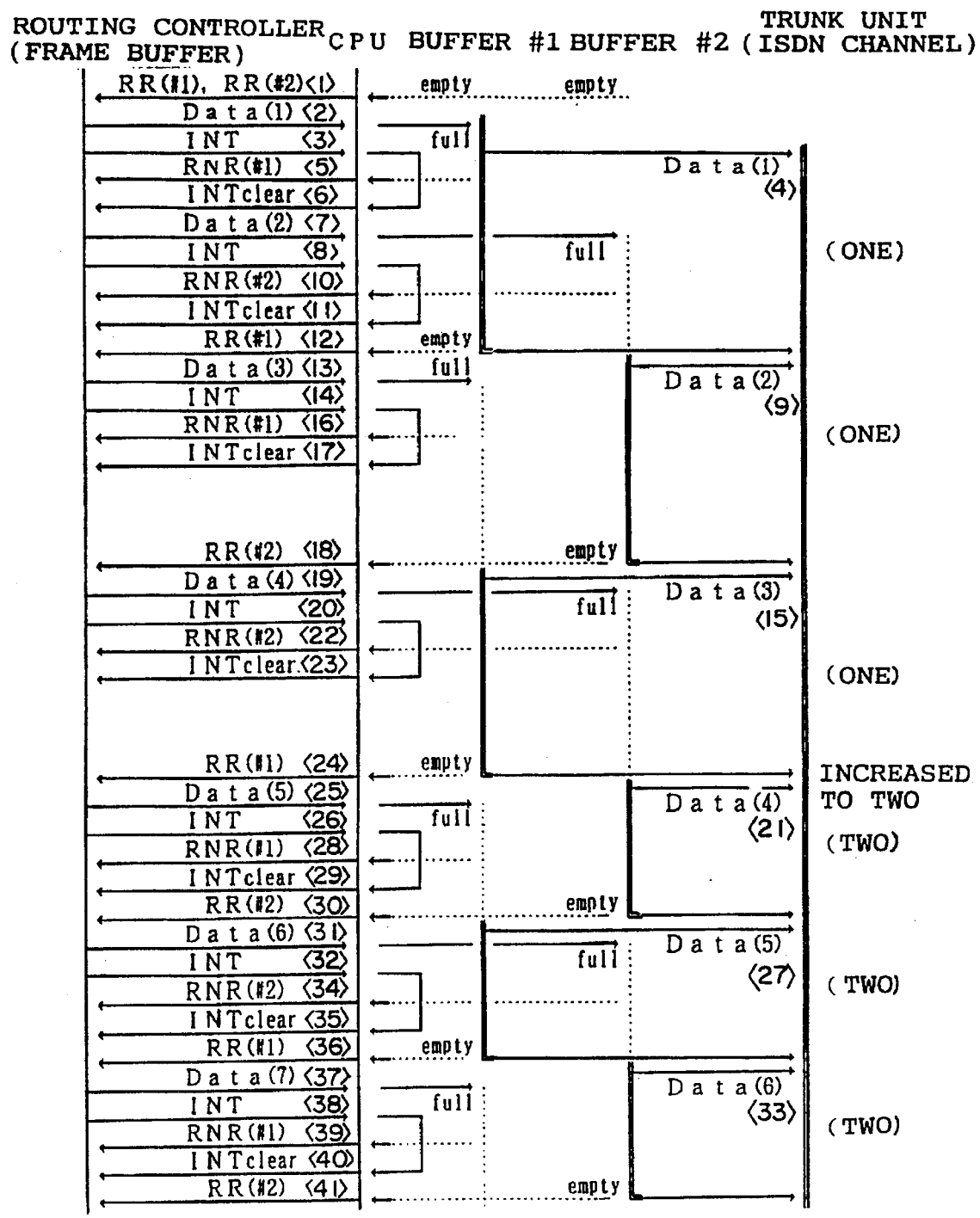
FIG. 10 is a time arrow view showing transmitting of LAN data at the first embodiment according to the present invention.

Next, controls for transferring LAN data from the frame buffer 17 to the ISDN channel executed by the first LAN connecting device 1a after the channels are set in the way mentioned above will be described with reference to FIG. 10. For the purpose of explanation, in an initial state both of the buffers 20a and 20b composing the toggle buffer memory 20 are assumed to be empty.

First, when detecting that both buffers 20a and 20b are empty, the CPU 14 executing the function of the buffer state monitoring part 15g will set bit "1" on the first and second areas 19a and 19b of the register to indicate to the routing controller 18 that data is receivable (RR) <1>.

When detecting that the bit "1" is set on the first and second areas 19a and 19b of the register 19, the routing controller 18 will first transfer LAN data (1) from the frame buffer 17 to the first buffer 20a <2>.

When transferring of this data (1) is finished(the first buffer 20a is filled), the routing controller 18 will set interrupting bit "1" on the third area 19c of the register 19 to make interruption on the CPU 14 (INT) <3>.

When receiving the interruption, the CPU 14 will start transmitting the LAN data (1) in the first buffer 20a to the channel as long as it is available <4>. In the initial state, the number of channels to be connected is one.

After transmitting the data, the CPU 14 will change the bit on the first area 19a of the register 19 to "0" to indicate to the routing controller 18 that data is unreceivable (RNR) <5>.

At the same time, the CPU 14 will clear the interruption on the third area 19c of the register 19 (INT clear) <6>.

On the other hand, the routing controller 18 will transfer LAN data (2) from the frame buffer 17 to the second buffer 20b at the same time when the CPU 14 transmits the data (1) from the first buffer 20a in accordance with the existence of the information bit "1" on the second area 19b of the register 19 <7>.

When transferring of this LAN data (2) is over(the second buffer 20b is filled), the routing controller 18 will set interruption bit "1" on the third area 19c of the register 19 to make interruption on the CPU 14 (INT) <8>.

When interrupted, the CPU 14 will start transmitting the data in the second buffer 20b to the channel waiting for the time when transmission of the data (1) from the first buffer 20a is over <9>.

Then, the CPU 14 will indicate to the routing controller 18 that data is unreceivable(RNR) changing the bit on the second area 19b of the register 19 <10>.

At the same time, the CPU 14 will clear the interruption on the third area 19c of the register 19 (INT clear) <11>.

When transmission of the data (1) from the first buffer 20a is finished, the CPU 14 will detect that the first buffer 20a is empty and set bit "1" on the first area 19a of the register 19 to indicate to the routing controller 18 that data is receivable(RR) <12>.

When detecting that the information bit "1" is set on the first area 19a of the register 19, the routing controller 18 will transfer LAN data (3) from the frame buffer 17 to the first buffer 20a <13>.

When transferring of this data is over (the first buffer 20a is filled), the routing controller 18 will place interruption bit "0" on the third area 19c of the register 19 to make interruption on the CPU 14 (INT) <14>.

When interrupted, the CPU 14 will start transmitting the data in the first buffer 20a to the channel waiting for the time when transmission of the data (2) from the second buffer 20b is finished <15>.

Then, the CPU 14 will change the bit on the first area 19a of the register 19 to "0" to indicate to the routing controller 18 that data is unreceivable (RNR) <16>.

At the same time, the CPU 14 will clear the interruption on the third area 19c of the register 19 (INT clear) <17>.

When transmission of the data (2) from the second buffer 20b is over, the CPU 14 will detect that the second buffer 20b is empty and set bit "1" on the second area 17b of the register to indicate to the routing controller 18 that data is receivable(RR) <18>.

When detecting that the information bit "1" is set on the second area 19b of the register 19, the routing controller 18 will transfer LAN data (4) from the frame buffer 17 to the second buffer 20b <19>.

When transferring of this data is over(the second buffer 20b is filled), the routing controller 18 will place interruption bit on the third area 19c of the register 19 to make interruption on the CPU 14 (INT) <20>.

When interrupted, the CPU 14 will start sending the data in the second buffer 20b to the channel waiting for the time when transmission of the data (3) from the first buffer 20a is finished <21>.

Then, the CPU 14 will change the bit on the second area 19b of the register 19 to indicate to the routing controller 18 that data is unreceivable (RNR) <22>.

At the same time, the CPU 14 will clear the interruption bit on the third area 19c of the register 19 (INT clear) <23>.

In the case where a call for addition of a channel is received and one channel is added when transmission of the data (3) from the first buffer 20a is finished, transmission <21> of the data to be followingly executed will be done via the two channels. Thus, it is to be decided by the band determining block 15d that the CPU 14 will transfer the LAN data from the toggle buffer memory 20 to the trunk unit 13 at a band twice as large (clock frequency as before). Then, thereafter transmission of data from the respective buffers 20a and 20b will be executed at a speed nearly twice as fast as before. Also, in the same manner as mentioned above the LAN data will be sent to the toggle buffer memory 20 and the the channels will be set.

Next, the contents of processings executed at the respective LAN connecting devices 1 for carrying out the controls mentioned above will be described with reference to the flow charts shown in FIGS. 11 to 14.

Figure 11:
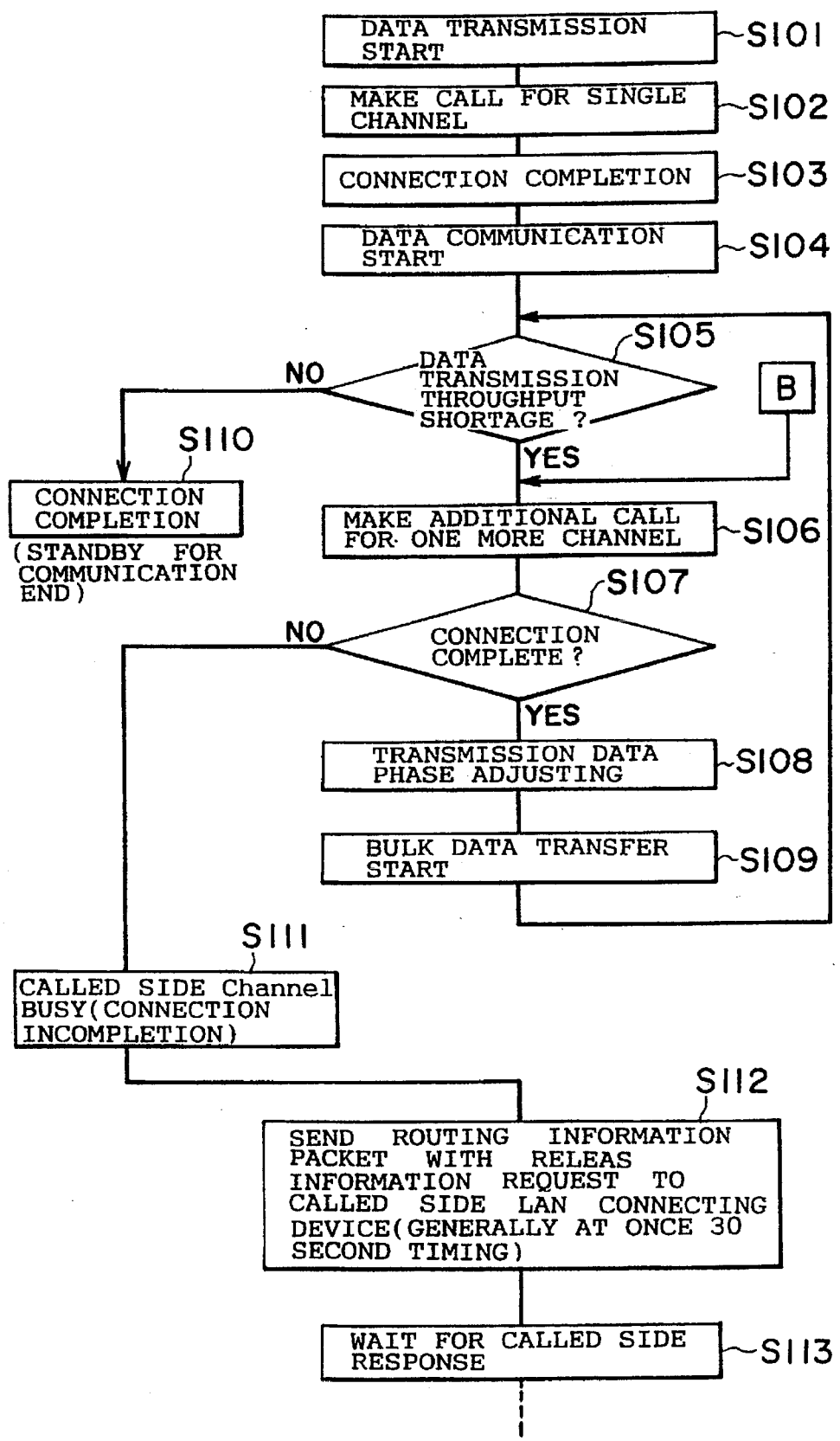
FIG. 11 is a flow chart showing channel connecting carried out at a LAN connecting device at a caller side in FIG. 5.

The flow chart shown in FIG. 11 shows processings executed in the LAN connecting device 1a at the caller side. This flow chart in FIG. 11 starts from a step S101 when transmission of the LAN data from the data transmission originating terminal 2a to the LAN connecting device 1a at the caller side via the LAN is started.

Then, at the step S102, the multichannel calling block 15a makes a call for setting the private channel of the ISDN. In this case, the buffer state monitoring block 15g monitors the state of the toggle buffer memory 20, calculates the necessary number of channels and reports it to the multichannel calling block 15a. However, as no data is transmitted at this time, the buffer state monitoring block 15g calculates the minimum number.

Figure 14:
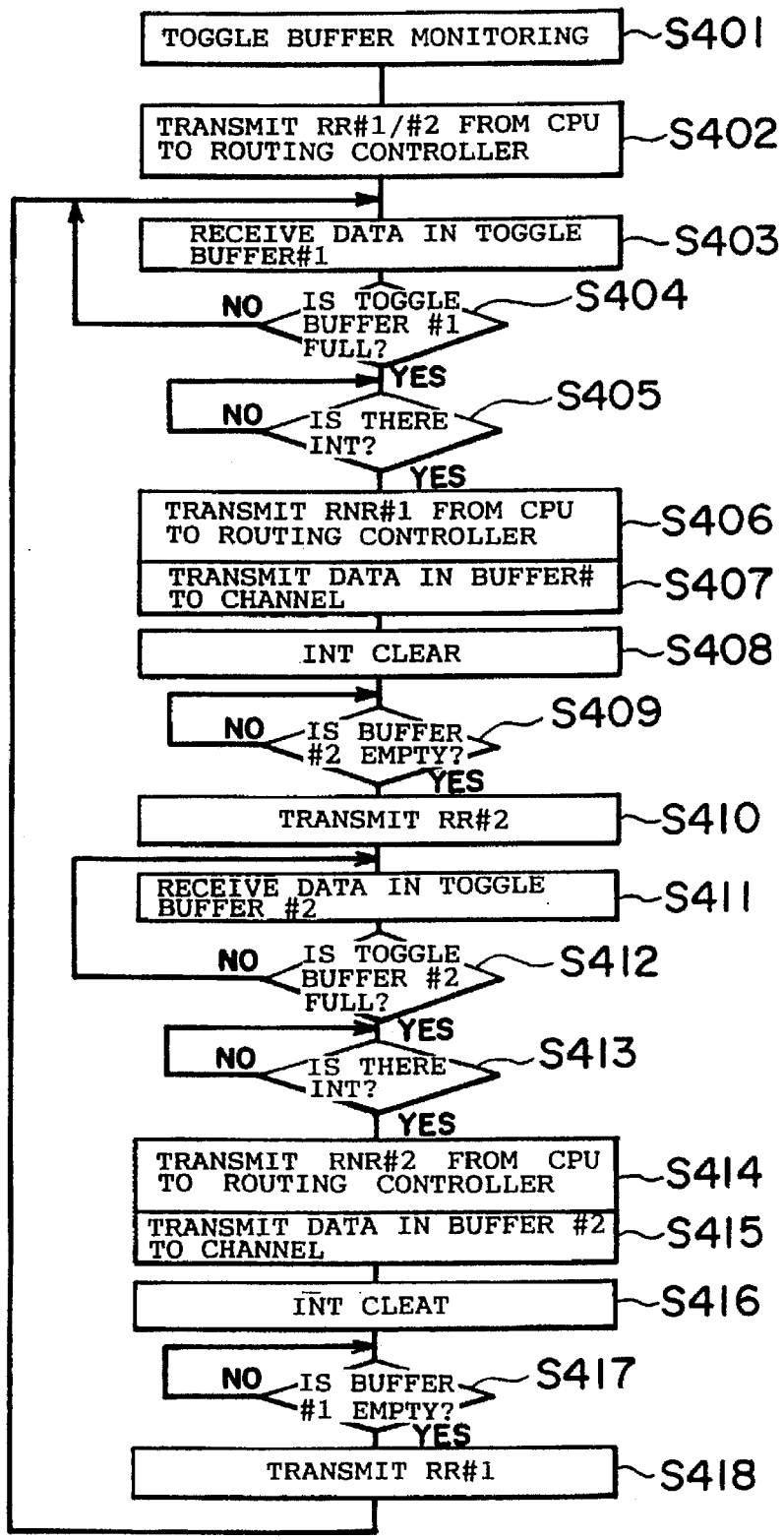
FIG. 14 is a flow chart showing transmitting of LAN data carried out at a LAN connecting device at a caller side in FIG. 5.

When the setting is completed at the step S103, the CPU 14 will start data communications at the step S104. That is, the CPU 14 will start a processing for data communications shown in FIG. 14. Once this processing is started as shown in FIG. 14, the processing in FIG. 11 proceeds asynchronously with it.

Figure 12:
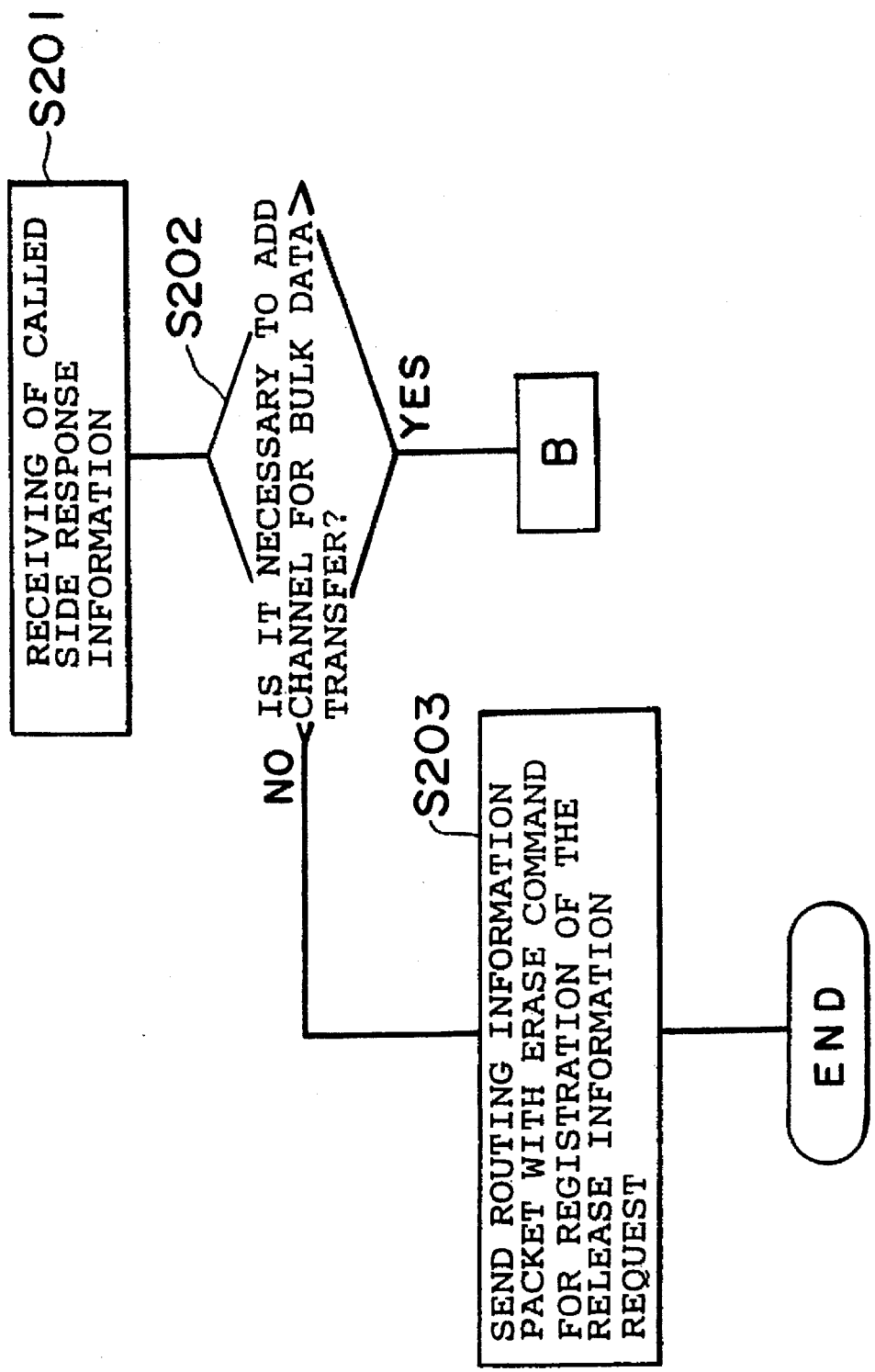
FIG. 12 is a flow chart showing channel connecting carried out at a LAN connecting device at a caller side in FIG. 5.

At the step S105, the buffer state monitoring block 15g checks if there is any shortage of data transmission throughput. If there is no shortage thereof, the setting will be completed at the step S110. In this case, the CPU 14 waits for the time when data transmission as shown in FIG. 12 is over.

On the other hand, in the case where there is a shortage of the data transmission throughput at the step S105, the multichannel calling block 15a makes a call for addition of one channel.

At the step S107, whether the setting is completed or not is checked. If it is completed, a processing for matching the phases of the transmitted data between the newly connected channels and the original channels will be carried out at the step S108.

At the step S109, transferring of bulk data on the newly set channels is started. Herein, the bulk data means a bunch of LAN data to be divided into a plurality of frames and sent within the ISDN. When this step S109 is over, a processing will be returned to the step S105.

On the other hand, in the case where setting is not completed at the step S107, engagement of the other channels at the call incoming side, that is, incomplete setting will be recognized at the step S111. Then, at the step S112, the CPU 14 sends a routing information(RIP) packet having a request command which requests that "notification will be made to the LAN connecting device 1a at the calling side which has made this request at the time of channel releasing" to the LAN connecting device 1b at the call incoming side at a specified timing (generally, once 30 seconds). Then, at the step S113, the CPU 14 waits for responses from the LAN connecting device 1b at the call incoming side. Thereafter, the CPU 14 will stop the channel setting process, so that the loads on the CPU 14 can be reduced.

Next, FIG. 12 is a flow chart showing processings which will be started in the LAN connecting device 1a at the calling side when responses come from the LAN connecting device 1b at the call receiving side after the step S113 is executed.

In FIG. 12, at the step S201, when receiving the response (the routing information packet having information on channel releasing at the receiving side (RIP)) from the LAN connecting device 1b, the CPU 14 will proceeds the process to the step S202.

At this step S202, the buffer state monitoring block decides if it is still necessary to add more channels for transferring of the bulk data. In the case where the buffer state monitoring block 15g decides that it is still necessary, the processing at the step S106 shown in FIG. 11 will be executed. In this case, a call will be made for adding one private channel of ISDN. In this case, as it is considered that setting of the channel will be completed immediately, the process proceeds from the step S107 to the step S109 and checking operation will be executed again at the step S105.

On the other hand, in the case where the buffer state monitoring block 15g decides that it is not necessary to add channels any more at the step S202, routing information (RIP) having a command for "erasing registration of the effect that notification will be made to the LAN connecting device 1a at the caller side at the time of channel releasing at the receiving side will be transmitted to the LAN connecting device 1b at the call receiving side. Thereafter, this processing is finished. Then, completion of the data communications by the already connected channels will be waited for.

Next, processings executed for receiving calls within the LAN connecting device 1b at the receiving side will be described with reference to FIG. 13.

Figure 13:
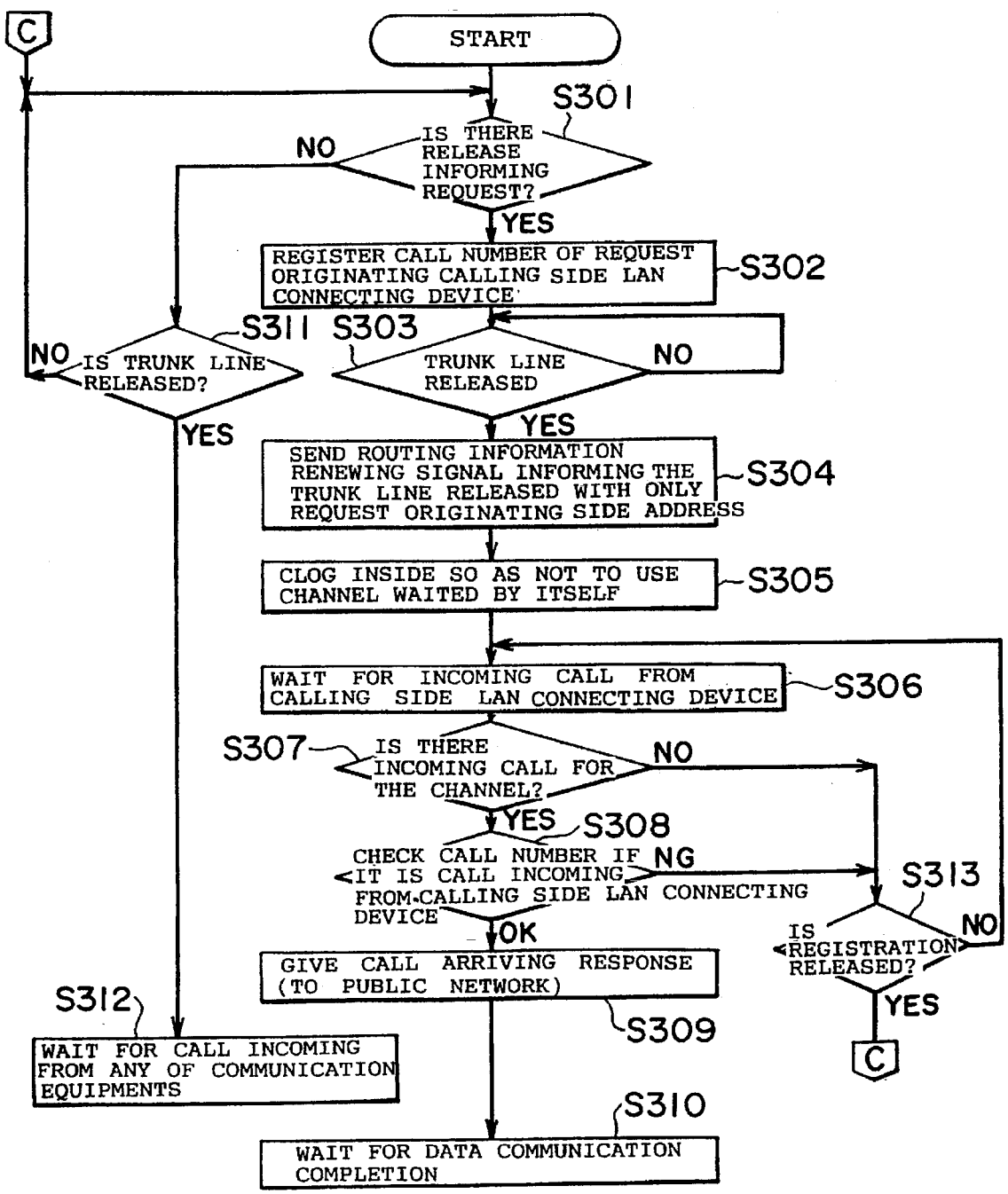
FIG. 13 is a flow chart showing channel connecting carried out at a LAN connecting device at a call receiving side in FIG. 5.

The processings shown in FIG. 13 are executed always at the same time when other processings (e.g., data transmission) are done in any of the LAN connecting devices 1. Thus, the processings will be started by starting the device.

First, at the step S311, it is checked whether there is a request to the effect that "notification will be made to the LAN connecting device 1a at the requesting side at the time of channel releasing" as the result of the step S112 shown in FIG. 11.

If there are no requests, at the step S311 checking will be made on whether the channel is open or not. If it is open, as the channels can be set based on the order of the calls to arrive, coming of the calls from any of the communication equipments will be waited for at the step S312. On the other hand, if the channel is not open, as there is a possibility that requests of the step S112 may be made from any of the other LAN connecting devices 1, the processing will be returned to the step S301.

On the other hand, when there is a request at the step S301, the CPU 14 will register the call number (address, identification number) of the LAN connecting device 1a at the caller side in the information registration block 151 at step S302.

Then, at the step S303 releasing of the channel will be waited for. When the channel is released, at the step S304, the route information sending restriction control block 15m will make "a routing information renewing signal for informing the requesting side of the releasing of the channel", add only the address of the LAN connecting device 1a at the requesting side to this routing information renewing signal and send it thereto (see the step S201 in FIG. 12).

At the step S305, the LAN connecting device 1b at the call receiving side clogs its inside so as not to use the channels waiting for the incoming calls. That is, the LAN connecting device 16 rejects call requests from the terminals connected to the LAN under itself.

Then, at the step S306, the LAN connecting device 1b at the call receiving side waits for the incoming calls from LAN connecting device 1a at the caller side (calls made at the step S106 in FIG. 11).

It is checked whether there are incoming calls on the waiting channels or not at the step S307. If no calls are incoming, the processing will proceed to the step S313.

In the case where it is decided that there are incoming calls at the step S307, at the following step S308 the LAN connecting device 1b at the call receiving side will check the incoming numbers included in the incoming calls (address, identification information) and identified whether they are the ones from the LAN connecting device 1a at the caller side whose requests have been registered or not at the step S302. If not, the calls will not be set and the processing will move to the step S313.

If they are identified to be the ones sent from the LAN connecting device 1a at the caller side registered at the step S308, at the following step S309 a response will be sent to the ISDN that the calls are receivable. In this way, a new channel will be set between the LAN connecting device 1a at the caller side and the one 1b at the call receiving side and data will be transferred at the step S109 in FIG. 11. Then, the LAN connecting device 1b at the receiving side waits for completion of data communications at the following step S310.

On the other hand, at the step S313, whether the call number of the LAN connecting device 1a at the requesting side registered at the step S302 has been cleared or not as a result of the command at the step S203 will be identified. If not cleared, as there is a possibility that calls will come from the LAN connecting device 1a at the caller side, the processing must be returned to the step S306. On the other hand, if the registration has been cleared, as it is not necessary to wait for incoming calls from the LAN connecting device 1a at the caller side ahead of others, the processing will be returned to the initial position.

Next, the processings which are started at the steps S104 and S109 in FIG. 11 will be described with reference to FIG. 14.

At the step S401 in FIG. 14, the monitoring processing of the toggle buffer memory 20 is carried out. When this operation is started, the buffers 20a and 20b of the toggle buffer memory 20 are both empty. Thus, at the following step S402, the CPU 14 will send information to the effect that both of the buffers 20a and 20b are in receivable states(RR) to the routing controller 18. At this time, the frame buffer 17 has been continuously receiving LAN data via the LAN interface 16.

At the step S403, the first buffer 20a of the toggle buffer memory 20 receives the LAN data transferred from the frame buffer 17.

If this first buffer 20a of the toggle buffer memory 20 is filled will be identified at the step S404. Then, the processing at the step S403 is repeated as long as this first buffer 20a is not filled.

When this first buffer 20a of the toggle buffer memory 20 is filled, the CPU 14 will wait for interruption(INT) from the routing controller 18 at the step S405.

When there is interruption, the CPU 14 will send information to the effect that the first buffer 20a is in an unreceivable state (RNR) to the routing controller 18 at the step S406.

At the step S407, the CPU 14 approves transmission of the data written in the first buffer 20a to the channels. When this is approved, transmission of the data in the first buffer 20a will be made possible (real data transmission is executed asynchronously with the processing in FIG. 14). However, in the case where the data in the second buffer 20b is being transmitted, the data in the first buffer 20a must be transmitted after it is completed. Also, after the processing at the step S109 in FIG. 11 the data in the first buffer 20a will be sent to the channels at a band (clock frequency) according to the number of the added channels.

Then, at the step S408, the CPU 14 clears the interruption (INT clear).

At the step S409, the CPU 14 waits until the second buffer 20b becomes empty. When it becomes empty, at the following step S410, the CPU 14 will indicate to the routing controller 18 that the second buffer 20b is now in a receivable state(RR).

At the step S411, the second buffer 20b of the toggle buffer memory 20 receives the LAN data transferred from the frame buffer 17.

Whether this second buffer 20b of the toggle buffer memory 20 is filled or not is identified at the step S412. As long as it is not filled, the processing at the step S411 will be repeated.

When this second buffer 20b of the toggle buffer memory 20 gets filled, the CPU 14 will wait for interruption (INT) from the routing controller 18 at the step S413.

When there is interruption, the CPU 14 will indicate to the routing controller 18 that the second buffer 20b is in an unreceivable state (RNR) at the step S414.

At the step S415, the CPU 14 approves transmission of the data written in the second buffer 20b to the channels. When this is approved, transmission of the data in the second buffer 20b will be made possible. However, if the data in the first buffer 20a is currently being transmitted, the data in the second buffer 20b will be sent after it is completed asynchronously with the processing in FIG. 14. Also, after the processing at the step S109 in FIG. 11 the data in the second buffer 20b will be sent to the channels at a band (clock frequency) according to the number of the added channels.

At the step S416, the CPU 14 clears the interruption (INT clear).

Then, at the step S417, the CPU 14 waits until the first buffer 20a becomes empty. When it becomes empty, the CPU 14 will indicate to the routing controller 18 that the first buffer 20a is in a receivable state (RR) at the step S418.

When the step S418 is over, the processing will be returned to the step S403. In this way, until there is no more LAN data to be transmitted, the processings alternately utilizing both buffers 20a and 20b will be executed.

SECOND EMBODIMENT

Figure 15:
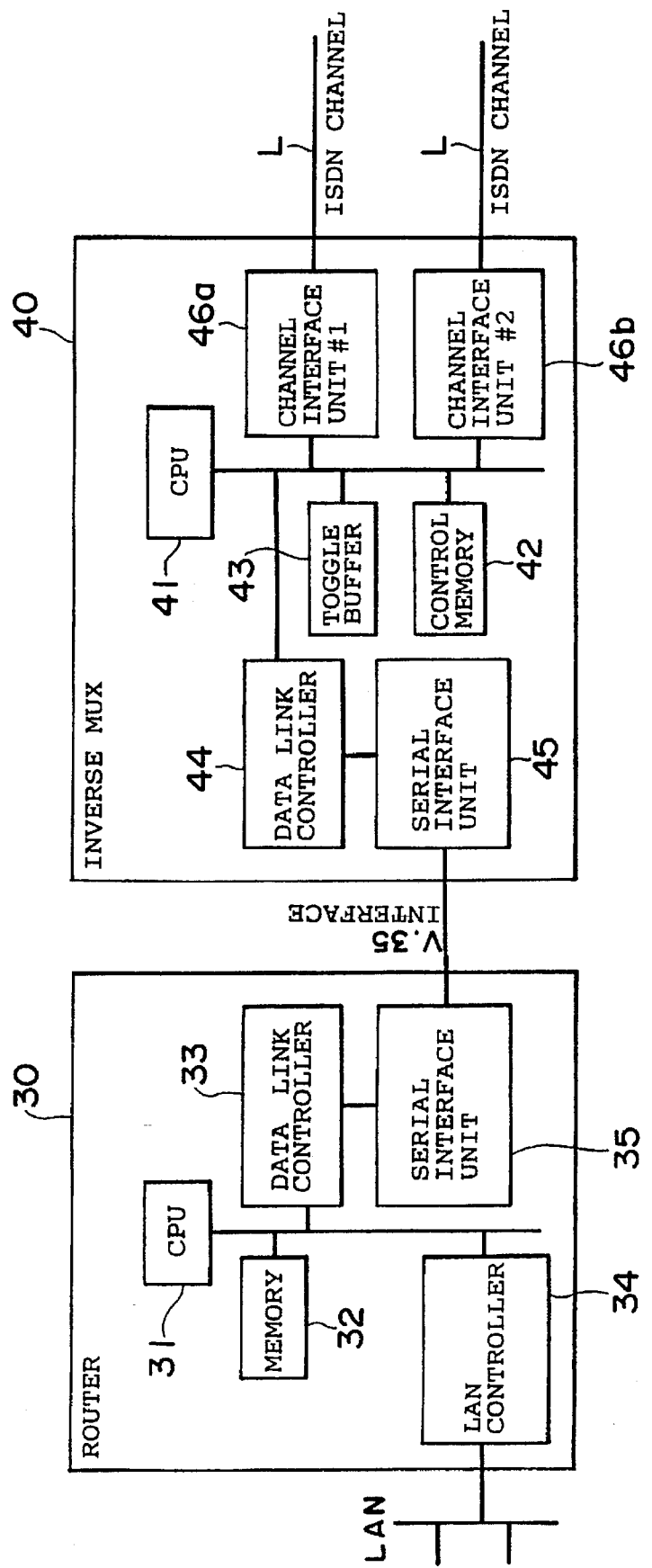
FIG. 15 is a block diagram showing a distributed LAN system at the second embodiment according to the present invention.

FIG. 15 is a view showing the LAN connecting device at the second embodiment according to the present invention. This LAN connecting device at the second embodiment includes an inverse MUX 40 corresponsive to the multiplexer 11 at the first embodiment and a router 30 corresponsive to the other device 12. These two mutually independent devices are connected by the interface of CCITT recommended V.35 and perform the function similar to the LAN connecting device 1 at the first embodiment. The LAN connecting device thus constructed becomes the LAN connecting device constructing the network shown in FIG. 5.

The router 30 is used for analyzing the address of the LAN data frame received from the LAN, convert it into a format according to the point to point protocol on the public network and provided with a function to add route information on the public network(ISDN). More in detail, it is constructed by a CPU 31, a memory 31, a data link controller 33 and a LAN controller which are mutually connected by a system bus and a serial interface unit 35 connected to the data link controller 33.

The CPU 31 is the processing device for executing programs loaded to the memory 33 and operates various controls within the router 30.

The LAN controller 34 is an interface for housing LANs.

The memory 33 is provided with a function as a buffer for temporarily storing the LAN data frame sent from the LAN side via the LAN controller 34 and a function for storing data to be sent and received with the inverse MUX 40 and programs to be executed on the CPU 31. The programs and the data stored in the control memory 42 include the route information managing part 15e of the control memory part 15 at the first embodiment and the route information table 15f. Termination of the point to point protocol by WAN is operated on this memory 33, as well.

The data link controller 33 is a control part for controlling the flow of data sent and received with the inverse MUX 40 and errors.

The serial interface unit 35 is an interface unit for supporting the serial interface of V.35.

The inverse MUX is provided with a function to distribute data transferred from the router 30 to a plurality of channels in accordance with the amount of data and a function to increase/decrease the number of channels based on the increase/decrease of the data amount. More in detail, it is constructed by a CPU 41, a control memory 42, a toggle buffer 43, a data link controller 44 and two channel interface units 46a and 46b which are mutually connected and a serial interface unit 45 connected to the data link controller 44. The CPU 41 is a processing device for executing programs loaded to the control memory 42 and operating various controls within the inverse MUX 40.

The channel interface units 46a and 46b are interfaces prepared for housing trunk channels L (ISDN channel). Each of the plurality of the channel interface units is provided with a buffer for taking out corresponding data from the data transmitted in time division multiplexed states at a certain band(e.g., 64 kbps, 128 kbps, 256 kbps, ...) from the CPU 14 and sending it to the trunk channel L at a band (64 kbps) specially used for ISDN.

The control memory 42 is provided with a function to store data to be sent and received with the router 30 and programs to be executed on the CPU 41. The programs stored in this control memory 42 include the multichannel calling part 15a, the routing information storing part 15b, the trunk channel trunk release monitoring part 15c, the band determining part 15d, the buffer state monitoring part (channel count calculating part) 15g, the engagement detecting part 15h, the calling terminal address storing part 15i, the information request making managing part 15j, the multichannel call incoming part 15k, the information registration storing part 15l and the route information sending limit control part 15m on the control part 15 at the first embodiment.

The toggle buffer memory 43 is a buffer for relying between the router 30 and the channel interface unit 46. This toggle buffer memory 43 is constructed by two buffers connected in parallel. The data written in this toggle buffer memory 43 can be read at a frequency(a band) different from the pulse frequency at the time of writing. Thus, by passing data via this toggle buffer memory 43 it is possible to convert the LAN data sent from the router 30 at a fixed band into an optional band.

The data link controller 44 is a control part for controlling the flow of data sent and received with the router 30 and errors.

The serial interface unit 45 is an interface for supporting the serial interface of V.35.

Between the router 30 and the inverse MUX 40 flow control information (RR,RNR) as done between the CPU 14 and the routing controller 18 and error control information (ACK) are transmitted. This transmission is operated by using an HDLC (high level data link) frame as shown in FIG. 16.

Figure 16:
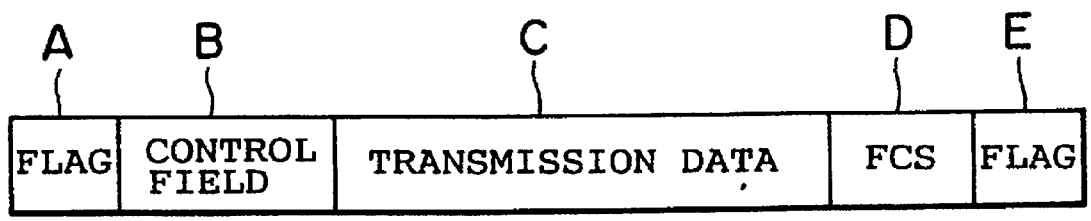
FIG. 16 is a view illustrating an HDLC frame used for communications between a router and an inverse MUX in FIG. 15.
Figure 17:
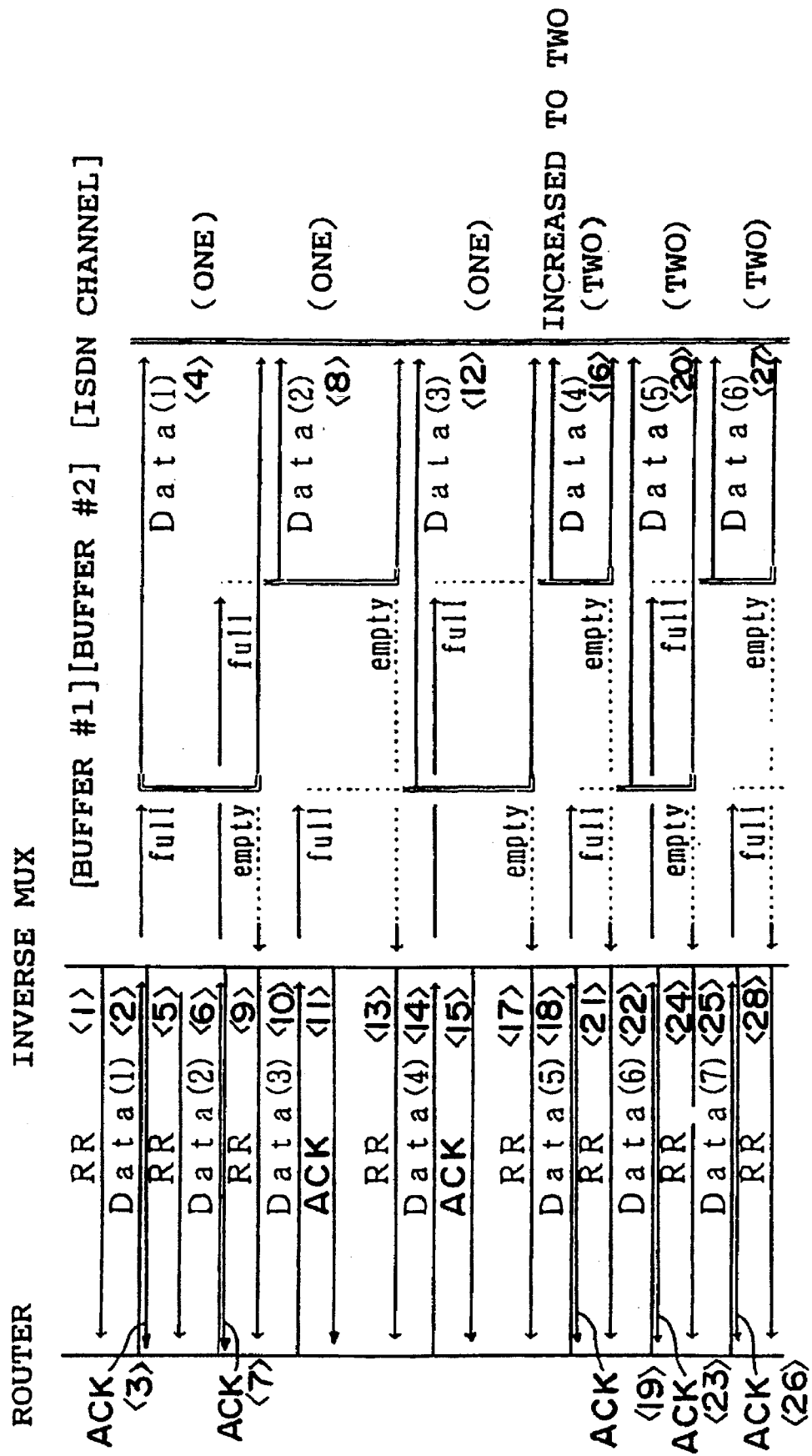
FIG. 17 is a time arrow view showing transmitting of LAN data at the second embodiment according to the present invention.

In FIG. 16, a flag sequence A is a flag showing the lead of the frame. A control field B is a field for storing such control data as receivable information (RR), unreceivable information (RNR), receiving confirmation information (ACK), the address of a communication partner and the like. Transmission data C generally stores user data. An FCS (frame check sequence) D is made at a frame sending side and a field for checking the existence of frame transmitting errors or the like at a frame receiving side. The receiving confirmation information(ACK) is information confirming that it has received the data to be sent to the router 30 when the inverse MUX 40 finishes receiving the LAN data from the router 30.

Next, the controls carried out at the second embodiment thus constructed will be described. However, the controls for channel connection at the second embodiment are the same as those at the first embodiment shown in FIGS. 11 to 13. Thus, transferring of LAN data from the router 30 to the ISDN channel will be described with reference to FIG. 7 in the case where the LAN data is sent from the LAN connecting device constructed in the above manner. For the purpose of explanation, in an initial state both buffers constructing the toggle buffer memory 43 are empty.

First, when detecting that the first buffer constructing the toggle buffer memory 43 (hereinafter called "the first buffer") is empty, the CPU 41 of the inverse MUX 40 will send the HDLC frame having the receival information(RR) to the router 30 <1>.

When detecting is receivable information (RR), the router 30 will first transfer the LAN data (1) to the inverse MUX 40 <2>.

Then, the CPU 41 will transfer this data (1) to the first buffer and send the HDLC frame having the receiving confirmation information (ACK) to the router 30 <3>.

When transferring of the data (1) to the first buffer is over, the CPU 41 will start sending the LAN data (1) in the first buffer to the first channel interface unit 46a as long as there are available channels <4>. In the initial state, the number of channels connected to the inverse MUX 40 is only one housed in the first channel interface unit 46a.

Immediately after transmission of the data (1), the CPU 41 will detect that the second buffer constructing the toggle buffer 43 (hereinafter called "the second buffer") is empty and send the HDLC frame including the receivable information (RR) to the router 30 <5>.

When detecting this receivable information (RR), the router 30 will transfer the LAN data (2) to the inverse MUX 40 <6>.

Then, the CPU 41 will transfer this data (2) to the second buffer and send the HDLC frame including the receiving confirmation information (ACK) to the router 30 <7>.

After transferring of the data (2) to the second buffer, the CPU 41 will wait until transmission of the data (1) from the first buffer is over and start sending the data in the second buffer to the first channel interface unit 46a <8>.

When transferring of the data (1) from the first buffer is finished, the CPU 41 will detect that the first buffer is empty and send the HDLC frame including the receivable information (RR) to the router 30 <9>.

When detecting this receivable information (RR), the router 30 will transfer the LAN data (3) to the inverse MUX 40 <10>.

Then, the CPU 41 will transfer this data (3) to the first buffer and send the HDLC frame including the receiving confirmation (ACK) to the router 30 <11>.

After transferring of the data (3) to the first buffer, the CPU 41 will wait until transmission of the data (2) from the second buffer is over and start sending the LAN data (3) in the first buffer to the first channel interface unit 46a <12>.

When transmission of the data (2) from the second buffer is finished, the CPU 41 will detect that the second buffer which is a part of the toggle buffer 43 is empty and send the HDLC frame including the receivable information (RR) to the router 30 <13>.

When detecting this receivable information (RR), the router 30 will transfer the LAN data (4) to the inverse MUX 40 <14>.

Then, the CPU 41 will transfer this data (4) to the second buffer and send the HDLC frame including the receiving confirmation information (ACK) to the router 30 <15>.

After transferring of the data (4) to the second buffer, the CPU 41 will wait until transmission of the data (3) from the first buffer is over and start sending the data in the second buffer <16>.

When transmission of the data (3) from the first buffer is finished, in the case where a call for addition of channels is received and two channels (channels housed in the first and second channel interface units 46a and 46b) are added, the following transmission of the data (4) <16> will be executed by the two channels. Thus, the CPU 41 band determining part 15d will the LAN data from the toggle buffer 43 to the respective channel interface units 46a and 46b at a band twice as large as before. Thereafter, by the similar procedure the data will be transferred to the toggle buffer memory 20 and to the channels.

At the LAN connecting device according to the present invention, it will be possible to efficiently obtain communication channels matching the amount of traffic. In particular, the first construction according to the invention will allow the LAN connecting device which makes calls ahead of others to take priority in channel connection at the time of channel releasing without increasing loads on the CPU. Further, the second means according to the invention will allow the LAN connecting device to transfer and process data changing bands (or clocks) within the multiplexer without the necessity for changing the clock frequencies outside the multiplexer.

This invention being thus described, it will be obvious that same may be varied in same way. Such variation are not be regarded as a departure from the spirit and scope of the invention, and all such modification as would be obvious to one skilled in the art intended to be included within the scope of the following claims.

What is claimed is:

1. A LAN connecting device for connecting a LAN and a network via a plurality of channels comprising:

an interface connectable to said plurality of channels;

a calling element requesting a communication equipment at a called side to set calls on said plurality of channels;

a channel shortage detecting element detecting calls are not set on as many channels as necessary for data transmission due to engagement of channels made by the communication equipment at the called side when requested to set the calls by said calling element;

an information requesting element for requesting channel release information to be given at the time of channel releasing from the communication equipment at said called side if said channel shortage detecting element detects that calls are not set on as many channels as necessary for the data transmission; and a control element for making said calling element request the communication equipment at the called side to set the calls if said channel release information is sent from the communication equipment at said called side.

2. A LAN connecting device for connecting a LAN and a network via a plurality of channels comprising:

an interface connectable to said plurality of channels;

a call setting element setting calls on said channels according to a call setting request made by a communicating equipment of a calling side;

a registering element for registering element for registering identification information of communication equipments of the calling side if the communication equipments of the calling side whose call setting request is rejected by said call setting element requests that channel release information be given;

a channel monitoring element for monitoring releasing of channels from calls which are set by said call setting element; and an information sending element for sending said channel release information to said communicating equipment of the calling side whose identification information is registered in said registering element if said channel monitoring means detects the releasing of said channel from said calls.

3. A LAN connecting system having a network, a first LAN connecting device for connecting a first LAN and said network via a plurality of channels and a second LAN connecting device for connecting a second LAN and said network via a plurality of channels, said first LAN connecting device comprising:

an interface connectable to said plurality of channels;

a calling element requesting said second LAN connecting device to set calls on said plurality of channels;

a channel shortage detecting element detecting that calls are not set on as many channels as necessary for data transmission due to engagement of channels made by said second LAN connecting device when requested to set the calls by said calling element;

an information requesting element for requesting channel release information to be given at the time of channel releasing from said second LAN connecting device if said channel shortage detecting element detects that calls are not set on as many channels as necessary for the data transmission,; and a control element for making said calling element request said second LAN connecting device to set the calls if said channel release information is sent from said second LAN connecting device, and said second LAN connecting device comprising:

an interface connectable to said plurality of channels;

a call setting element setting calls on said channels according to a request made by said calling element of said first LAN connecting device;

a registering element for registering identification information of said first LAN connecting device if said information requesting element of said first LAN connecting device requests the channel release information;

a channel monitoring means for monitoring releasing of channels from calls which are set by said call setting element; and an information sending element for sending said channel release information to said first LAN connecting device whose identification information is registered in said registering element if said channel monitoring means detects the releasing of said channel from said calls.

4. A LAN connecting system according to claim 3, wherein:

said control element, if said channel monitoring means detects the releasing of said channel from said calls, makes said calling element send identification information of said first LAN connecting device; and said call setting element sets calls only in a case where said identification information registered in said registering element and said identification information sent from said calling element are coincident.

5. A call setting method in a LAN connecting device connecting a LAN and a network via a plurality of channels, said method comprising steps of:

requesting a communication equipment at a called side to set calls on said plurality of channels;

requesting channel release information to be given at the time of channel releasing from the communication equipment at the called side, in the case where calls are not set on as many channels as necessary for data transmission because of engagement of channels made by the communication equipment at the called side when requested to set the calls; and re-requesting the communication equipment at the called side to set the calls, when said channel release information is sent from said communication equipment at the called side.

6. A call setting means at a LAN connecting system for setting calls between a first LAN connecting device for connecting a first LAN and a network via a plurality of channels and a second LAN connecting device for connecting a second LAN and said network via a plurality of channels, wherein:

a request for call setting is made by said first LAN connecting device to said second LAN connecting device;

as a result of this call setting request, in the case where calls are not set on the number of channels necessary for data transmission due to engagement of the channels by said second LAN connecting device, said first LAN connecting device requests said second LAN connecting device to send channel release information at the time of channel releasing; when a request is made for channel release information to be given by said first LAN connecting device, said second LAN connecting device registers this channel release information request;

when said channels are released, said second LAN connecting device sends said channel release information to said first LAN connecting device;

and when said channel release information is sent from said second LAN connecting device, said first LAN connecting device makes a request for call setting again to said second LAN connecting device.

7. The call setting means at the LAN connecting system according to claim 6, wherein call setting requested from said second LAN is not put into execution by said second LAN connecting device in the case where there is a channel release informing request.

8. The call setting means at the LAN connecting system according to claim 6, wherein when said first LAN connecting device makes the call setting request again, said second LAN connecting device compares a communication equipment which had sent a registered channel release information request and the first LAN connecting device, and said second LAN connecting device sets calls as requested only when they are coincident.

9. A LAN connecting device for connecting a LAN and a network via a plurality of channels comprising:

a first interface connectable to said plurality of channels;

a calling element requesting a communication equipment at a called side to set calls on said plurality channels;

a channel number calculating element calculating number of channels according to the amount of data to be transmitted to said communication equipment at the called side and making said calling element request said communication equipment at a called side to set the calls on as many channels as the calculated number;

a second interface connectable to said LAN;

a buffer temporarily storing data from said LAN via this second interface;

a data writing element writing said data from said LAN in said buffer at a fixed band; and a data transmitting element sending data written in said buffer to said first interface at a band according to the number of channels where the calls are set.

10. A LAN connecting device for connecting the LAN and a network via a plurality of channels comprising:

a first interface connectable to said plurality of channels;

a calling element requesting a communication equipment at a called side to set calls on said plurality of channels;

a channel number calculating element calculating number of channels according to the amount of data to be transmitted to said communication equipment at the called side and making said calling element request said communication equipment at a called side to set the calls on as many channels as the calculated number;

a channel shortage detecting element detecting that calls are not set on as many channels as the number calculated by said channel number calculating means due to engagement of channels made by the communication equipment at the called side when requested to set calls by said calling element;

an information requesting element, if said channel shortage detecting element detects that calls are not set on as many channels as the calculated number, requesting channel release information to be given at the time of channel releasing from the communication equipment at the called side to set the calls a control element making said calling element request side communication equipment at said called side to set the calls if said channel release information is sent from the communication equipment at said called side;

a second interface connectable to said LAN;

a buffer temporarily storing data transmitted from a LAN via said second interface;

a data writing element writing said data in said buffer at a fixed band; and a data sending element sending the data written in said buffer to said first interface at a band according to the number of channels where the calls are set.

11. The LAN connecting device according to claim 9, further comprising a buffer monitoring means for monitoring the amount of data written in said buffer, wherein:

when transmission of all the data written in said buffer to said first interface is finished, said buffer monitoring means sends a writable signal indicating that writing is possible to said data writing means;

upon receiving said writable signal said data writing means writes said data in said buffer.

12. The LAN connecting device according to claim 11, wherein:

when transmission of the data written in said buffer to said first interface is not finished yet, said buffer monitoring means sends unwritable signal indicating that writing is not possible to said data writing means;

and upon receiving said unwritable signal said data writing means stops writing of said data in said buffer until it receives said writable signal.

13. The LAN connecting device according to claim 11, wherein when writing of said data in said buffer by said data writing means is finished, said buffer monitoring means sends a receiving confirmation signal indicating that the data has been received to said data writing means.

14. The LAN connecting device according to claim 11, wherein when writing of said data in said buffer is completed, said data writing means asks said data sending means to send the data written in said buffer to said first interface.

15. The LAN connecting device according to claim 9, wherein:

said buffer is made of a plurality of buffers connected in parallel;

said data writing means write data in each of the plurality of buffers in sequence;

and said data sending means sends said data in each of the plurality of buffers to said first interface in sequence.

16. The LAN connecting device according to claim 11, wherein:

said buffer is made of a plurality of buffers connected in parallel;

said data writing means writes data in each of the plurality of buffers in sequence;

said data sending means sends said data in each of the plurality of buffers to said first interface in sequence;

and said buffer monitoring means monitors each of the individual buffers.

17. The LAN connecting device according to claim 11, wherein communications between said buffer monitoring means and said data writing means are carried out via a register provided therebetween.

18. The LAN connecting device according to claim 11, wherein communications between said buffer monitoring means and said data writing means are carried out by using a data frame via communication channels provided therebetween.

* * * * *